US012501078B2

(12) United States Patent
Deshpande

(10) Patent No.: US 12,501,078 B2
(45) Date of Patent: Dec. 16, 2025

(54) SYSTEMS AND METHODS FOR SIGNALING TYPES OF PICTURES AND ASSOCIATED INFORMATION IN VIDEO CODING

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/532,832

(22) Filed: Dec. 7, 2023

(65) Prior Publication Data

US 2024/0121442 A1    Apr. 11, 2024

Related U.S. Application Data

(63) Continuation of application No. 17/433,184, filed as application No. PCT/JP2020/007239 on Feb. 21, 2020, now Pat. No. 11,889,118.

(60) Provisional application No. 62/817,527, filed on Mar. 12, 2019, provisional application No. 62/809,702, filed on Feb. 24, 2019.

(51) Int. Cl.
*H04N 7/12* (2006.01)
*H04N 19/169* (2014.01)
*H04N 19/172* (2014.01)
*H04N 19/70* (2014.01)

(52) U.S. Cl.
CPC .......... *H04N 19/70* (2014.11); *H04N 19/172* (2014.11); *H04N 19/188* (2014.11)

(58) Field of Classification Search
CPC .... H04N 19/70; H04N 19/172; H04N 19/188; H04N 19/107; H04N 19/174; H04N 19/96; H04N 19/61
See application file for complete search history.

(56) References Cited

U.S. PATENT DOCUMENTS

| | | | |
|---|---|---|---|
| 2003/0156640 A1* | 8/2003 | Sullivan | H04N 21/8455 375/240.01 |
| 2013/0279575 A1* | 10/2013 | Wang | H04N 19/70 375/240.12 |
| 2014/0016697 A1* | 1/2014 | Wang | H04N 19/573 375/240.12 |

(Continued)

OTHER PUBLICATIONS

Pettersson, Martin et al., "AHG14: Normative Recovery Point Indication", JVET-M0529-v1 Joint Video Experts Team (JVET) of ITU-T SG 16 WP 3 and ISO/IEC JTC 1/SC 29/WG 11 14th Meeting: Marrakesh, MA, Jan. 9-18, 2019.

(Continued)

*Primary Examiner* — Gims S Philippe
(74) *Attorney, Agent, or Firm* — ScienBiziP, P.C.

(57) ABSTRACT

This disclosure relates to video coding and more particularly to techniques for signaling types of pictures for coded video. In particular, this dis-closure describes techniques for enabling and signaling a so-called gradual random access picture. According to an aspect of an invention, a second syntax element is decoded by using a value of a first syntax element wherein the first syntax element indicates a picture is a random access picture having a recovery point picture and the second syntax element specifies a first picture order count value of the recovery point picture.

3 Claims, 6 Drawing Sheets

(56) References Cited

U.S. PATENT DOCUMENTS

| | | | |
|---|---|---|---|
| 2015/0195555 A1* | 7/2015 | Hendry | H04N 19/30 375/240.16 |
| 2015/0271498 A1 | 9/2015 | Wang et al. | |
| 2015/0271525 A1 | 9/2015 | Hendry et al. | |
| 2015/0382018 A1 | 12/2015 | Hendry et al. | |
| 2016/0094860 A1 | 3/2016 | Minezawa et al. | |
| 2018/0213300 A1* | 7/2018 | Chen | H04N 21/8456 |
| 2021/0067834 A1 | 3/2021 | Li et al. | |

OTHER PUBLICATIONS

Andrew Segall et al., "Joint Call for Proposals on Video Compression with Capability beyond HEVC", JVET-H1002 (v6) Joint Video Exploration Team (JVET) of ITU-T SG 16 WP 3 and ISO/IEC JTC 1/SC 29/WG 11 8th Meeting: Macao, CN, Oct. 18-24, 2017.

Benjamin Bross et al., "Versatile Video Coding (Draft 4)", JVET-M1001-v3 Joint Video Experts Team (JVET) of ITU-T SG 16 WP 3 and ISO/IEC JTC 1/SC 29/WG 11 13th Meeting: Marrakech, MA, Jan. 9-18, 2019.

Benjamin Bross, "Working Draft 1 of Versatile Video Coding", JVET-J1001-v2 ISO/IEC JTC1/SC29/WG11 N17669, Apr. 2018, San Diego, CA, US.

Jianle Chen et al., "Algorithm Description of Joint Exploration Test Model 7 (JEM 7)", JVET-G1001-v1 Joint Video Exploration Team (JVET) of ITU-T SG 16 WP 3 and ISO/IEC JTC 1/SC 29/WG 11 7th Meeting: Torino, IT, Jul. 13-21, 2017.

International Telecommunication Union, High efficiency video coding, Series H: Audiovisual and Multimedia Systems, Infrastructure of audiovisual services—Coding of moving video, Telecommunication Standardization Sector of ITU, Recommendation ITU-T H.265, Dec. 2016.

International Telecommunication Union, Advanced video coding for generic audiovisual services, Series H: Audiovisual and Multimedia Systems, Infrastructure of audiovisual services—Coding of moving video, Telecommunication Standardization Sector of ITU, Recommendation ITU-T H.264, Apr. 2017.

Non-Final Rejection dated Jun. 16, 2023 for U.S. Appl. No. 17/433,184.

Notice of Allowance and Fee(s) Due issued on Sep. 14, 2023 for U.S. Appl. No. 17/433,184.

* cited by examiner

SYSTEMS AND METHODS FOR SIGNALING TYPES OF PICTURES AND ASSOCIATED INFORMATION IN VIDEO CODING

CROSS REFERENCE

The present application is a continuation application of U.S. patent application Ser. No. 17/433,184, filed on Aug. 23, 2021, which is the National Stage of International Application No. PCT/JP2020/007239, filed on Feb. 21, 2020, which claims priority under 35 U.S.C. § 119 on provisional Application No. 62/817,527 on Mar. 12, 2019, No. 62/809,702 on Feb. 24, 2019, the entire contents of which are hereby incorporated by reference.

TECHNICAL FIELD

This disclosure relates to video coding and more particularly to techniques for signaling types of pictures for coded video.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the $10^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 4)," 13th Meeting of ISO/IEC JTC1/SC29/WG11 9-18 Jan. 2019, Marrakech, MA, document JVET-M1001-v3, which is incorporated by reference herein, and referred to as JVET-M1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: decoding a first syntax element indicating a picture is a random access picture having a recovery point picture; decoding a second syntax element specifying a first picture order count value of the recovery point picture; and generating unavailable reference pictures when the picture is the random access picture, wherein the second syntax element is decoded by using a value the first syntax element.

In one example, a method of coding data, the method comprising: coding a first syntax element indicating a picture is a random access picture having a recovery point picture; coding a second syntax element specifying a first picture order count value of the recovery point picture; and generating unavailable reference pictures when the picture is the random access picture, wherein the second syntax element is coded by using a value the first syntax element.

DESCRIPTION OF EMBODIMENTS

Figure 1:
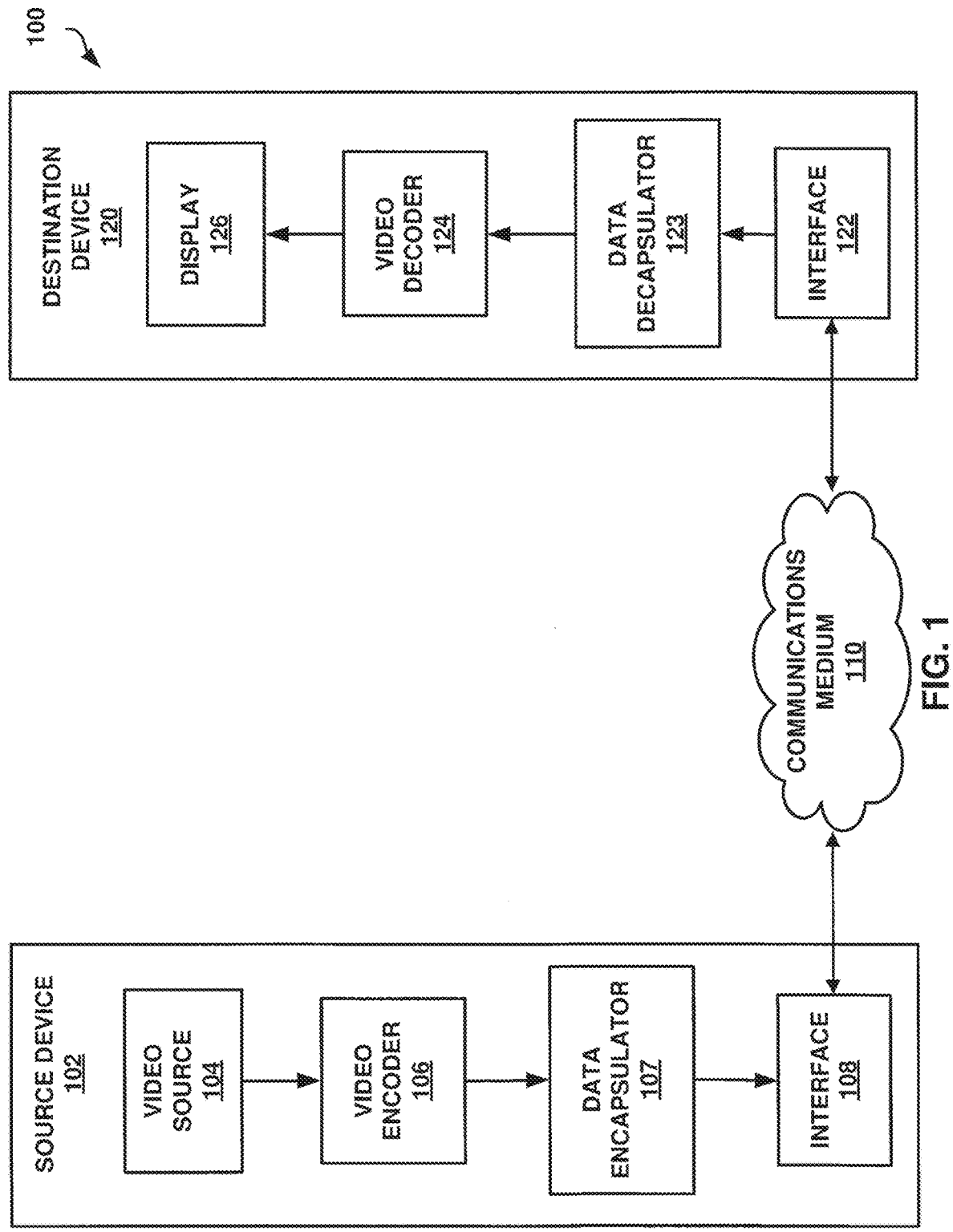
FIG. 1 is a block diagram illustrating an example of a system that may be configured to encode and decode video data according to one or more techniques of this this disclosure.

In general, this disclosure describes various techniques for coding video data. In particular, this disclosure describes techniques for signaling types of pictures for coded video data. In particular, this disclosure describes techniques for enabling and signaling a so-called gradual random access picture. Gradual random access pictures may be useful for improving video decoding at random access points. It should be noted that although techniques of this disclosure are described with respect to ITU-T H.264, ITU-T H.265, JEM, and JVET-M1001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-M1001. Thus, reference to ITU-T H.264, ITU-T H.265, JEM, and/or JVET-M1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of signaling a picture information for decoding video data, comprises signaling a flag in a parameter set indicating whether gradual random access picture information is conditionally present in a tile group header and signaling a flag in a tile group header indicating the presence of gradual random access picture information.

In one example, a device comprises one or more processors configured to signal a flag in a parameter set indicating whether gradual random access picture information is conditionally present in a tile group header and signal a flag in a tile group header indicating the presence of gradual random access picture information.

In one example, a non-transitory computer-readable storage medium comprises instructions stored thereon that, when executed, cause one or more processors of a device to signal a flag in a parameter set indicating whether gradual random access picture information is conditionally present in a tile group header and signal a flag in a tile group header indicating the presence of gradual random access picture information.

In one example, an apparatus comprises means for signaling a flag in a parameter set indicating whether gradual random access picture information is conditionally present in a tile group header and means for signaling a flag in a tile group header indicating the presence of gradual random access picture information.

In one example, a method of decoding video data comprises parsing a flag in a parameter set indicating whether gradual random access picture information is conditionally present in a tile group header, based on the value of the flag in a parameter set conditionally, parsing a flag in a tile group header indicating the presence of gradual random access picture information, and generating video data based the presence of gradual random access picture information.

In one example, a device comprises one or more processors configured to parse a flag in a parameter set indicating whether gradual random access picture information is conditionally present in a tile group header, based on the value of the flag in a parameter set conditionally, parse a flag in a tile group header indicating the presence of gradual random access picture information, and generate video data based the presence of gradual random access picture information.

In one example, a non-transitory computer-readable storage medium comprises instructions stored thereon that, when executed, cause one or more processors of a device to parse a flag in a parameter set indicating whether gradual random access picture information is conditionally present in a tile group header, based on the value of the flag in a parameter set conditionally, parse a flag in a tile group header indicating the presence of gradual random access picture information, and generate video data based the presence of gradual random access picture information.

In one example, an apparatus comprises means for parsing a flag in a parameter set indicating whether gradual random access picture information is conditionally present in a tile group header, based on the value of the flag in a parameter set conditionally, means for parsing a flag in a tile group header indicating the presence of gradual random access picture information, and means for generating video data based the presence of gradual random access picture information.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-M1001, CTUs are partitioned according a quadtree plus multi-type tree (QTMT) structure. The QTMT in JVET-M1001 is similar to the QTBT in JEM. However, in JVET-M1001, in addition to indicating binary splits, the multi-type tree may indicate so-called ternary (or triple tree (TT)) splits. A ternary split divides a block vertically or horizontally into three blocks. In the case of a vertical T split, a block is divided at one quarter of its width from the left edge and at one quarter its width from the right edge and in the case of a horizontal TT split a block is at one quarter of its height from the top edge and at one quarter of its height from the bottom edge.

Figure 2:
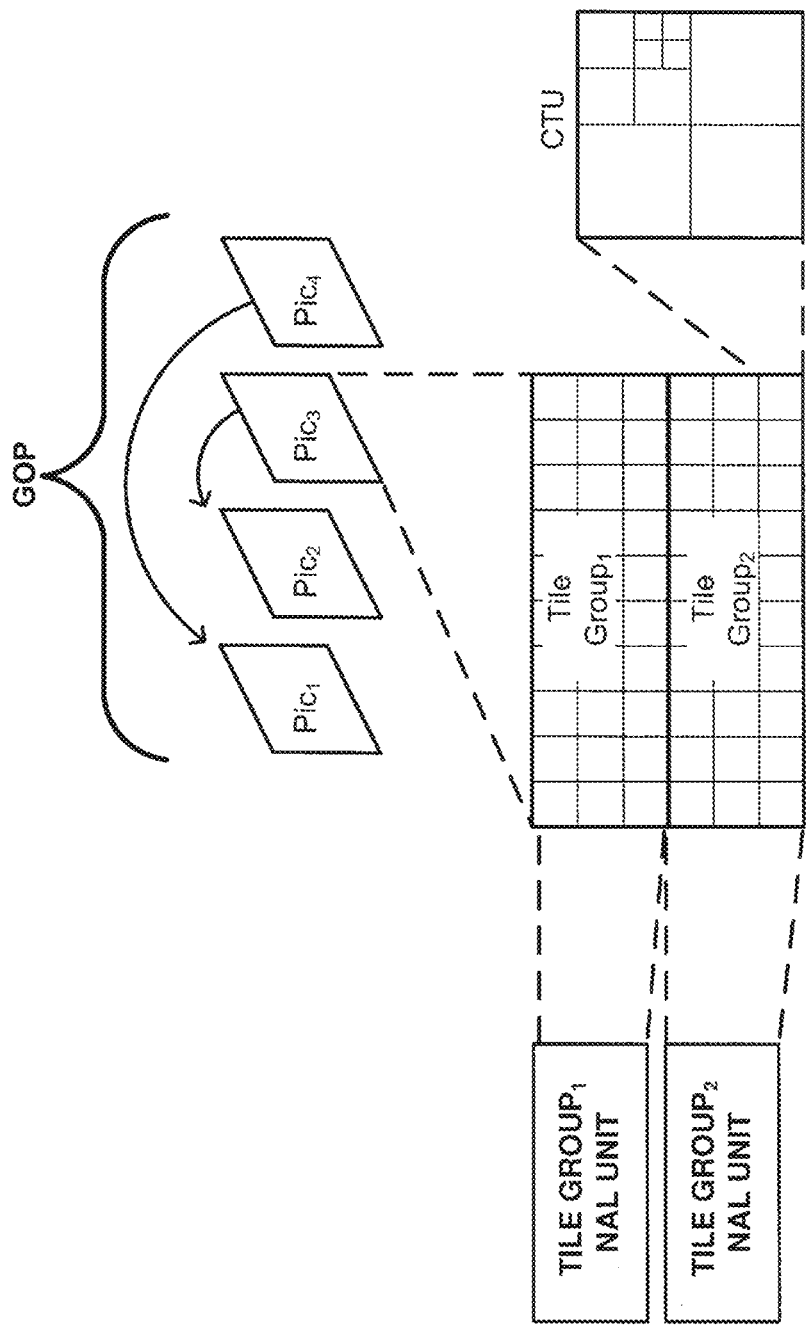
FIG. 2 is a conceptual diagram illustrating coded video data and corresponding data structures according to one or more techniques of this this disclosure.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-M1001, slices are required to consist of an integer number of complete tiles instead of only being required to consist of an integer number of CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 2 is a conceptual diagram illustrating an example of a group of pictures including tile groups. In the example illustrated in FIG. 2, $Pic_3$ is illustrated as including two tile groups (i.e., Tile $Group_1$ and Tile $Group_2$). It should be noted that in some cases, Tile $Group_1$ and Tile $Group_2$ may be classified as slices and/or tiles.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B tile group), bi-prediction, uni-prediction, and intra prediction modes may be utilized, for regions having a P type (e.g., a P tile group), uni-prediction, and intra prediction modes may be utilized, and for regions having an I type (e.g., an I tile group), only intra prediction modes may be utilized. As described above, reference pictures are identified through reference indices. For example, for a P tile, there may be a single reference picture list, RefPicList0 and for a B tile, there may be a second independent reference picture list, RefPicList1, in addition to RefPicList0. It should be noted that for uni-prediction in a B tile group, one of RefPicList0 or RefPicList1 may be used to generate a prediction. Further, it should be noted that during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-M1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed. It should be noted that in JVET-M1001, a coding unit included in a P or B tile group may be coded according to a CU skip mode, where when the CU skip mode is indicated, the coding unit is coded according to subset of motion vector prediction modes and the coding unit is coded from the prediction directly, i.e., residual data is not used to code the video block.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like. Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.

$$\frac{x}{y}$$

Used to denote division in mathematical equations where no truncation or rounding is intended.

Further, the following mathematical functions may be used:

Log 2(x) the base-2 logarithm of x;

$$\text{Min}(x, y) = \begin{cases} x & ; \ x <= y \\ y & ; \ x > y \end{cases};$$

$$\text{Max}(x, y) = \begin{cases} x & ; \ x >= y \\ y & ; \ x < y \end{cases}$$

Ceil(x) the smallest integer greater than or equal to x.

With respect to the example syntax used herein, the following definitions of logical operators may be applied:

x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Further, the following relational operators may be applied:

> Greater than
>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).
f(n): fixed-pattern bit string using n bits written (from left to right) with the left bit first. The parsing process for this descriptor is specified by the return value of the function read_bits(n).
u(n): unsigned integer using n bits.
ue(v): unsigned integer 0-th order Exp-Golomb-coded syntax element with the left bit first.
se(v): signed integer 0-th order Exp-Golomb-coded syntax element with the left bit first.

As described above, video content includes video sequences comprised of a series of frames (or pictures) and each video frame or picture may divided into one or more regions. A coded video sequence (CVS) may be encapsulated (or structured) as a sequence of access units, where each access unit includes video data structured as network abstraction layer (NAL) units. A bitstream may be described as including a sequence of NAL units forming one or more CVSs. It should be noted that multi-layer extensions enable a video presentation to include a base layer and one or more additional enhancement layers. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter prediction techniques) by referencing one or more pictures (including scaled versions thereof) in a base layer. Each NAL unit may include an identifier indicating a layer of video data the NAL unit is associated with. It should be noted that sub-bitstream extraction may refer to a process where a device receiving a compliant bitstream forms a new compliant bitstream by discarding and/or modifying data in the received bitstream. For example, sub-bitstream extraction may be used to form a new compliant bitstream corresponding to a particular representation of video (e.g., a high quality representation).

Referring to the example illustrated in FIG. 2, each tile group of video data included in $Pic_3$ (i.e., Tile $Group_1$ and Tile $Group_2$) is illustrated as being encapsulated in a NAL unit. In JVET-M1001, each of a video sequence, a GOP, a picture, a tile group, and CTU may be associated with metadata that describes video coding properties. JVET-M1001 defines parameters sets that may be used to describe video data and/or video coding properties. In JVET-M1001, parameter sets may be encapsulated as a special type of NAL unit or may be signaled as a message. NAL units including coded video data (e.g., a tile group) may be referred to as VCL (Video Coding Layer) NAL units and NAL units including metadata (e.g., parameter sets) may be referred to as non-VCL NAL units. Further, JVET-M1001 enables supplemental enhancement information (SEI) messages to be signaled. In JVET-M1001, SEI messages assist in processes related to decoding, display or other purposes, however, SEI messages may not be required for constructing the luma or chroma samples by the decoding process. In JVET-M1001, SEI messages may be signaled in a bitstream using non-VCL NAL units. Further, SEI messages may be conveyed by some means other than by being present in the bitstream (i.e., signaled out-of-band).

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 2, $Pic_3$ is illustrated as referencing $Pic_2$. Similarly, $Pic_4$ is illustrated as referencing $Pic_1$. With respect to FIG. 2 assuming the picture number corresponds to the decoding order the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

Figure 3:
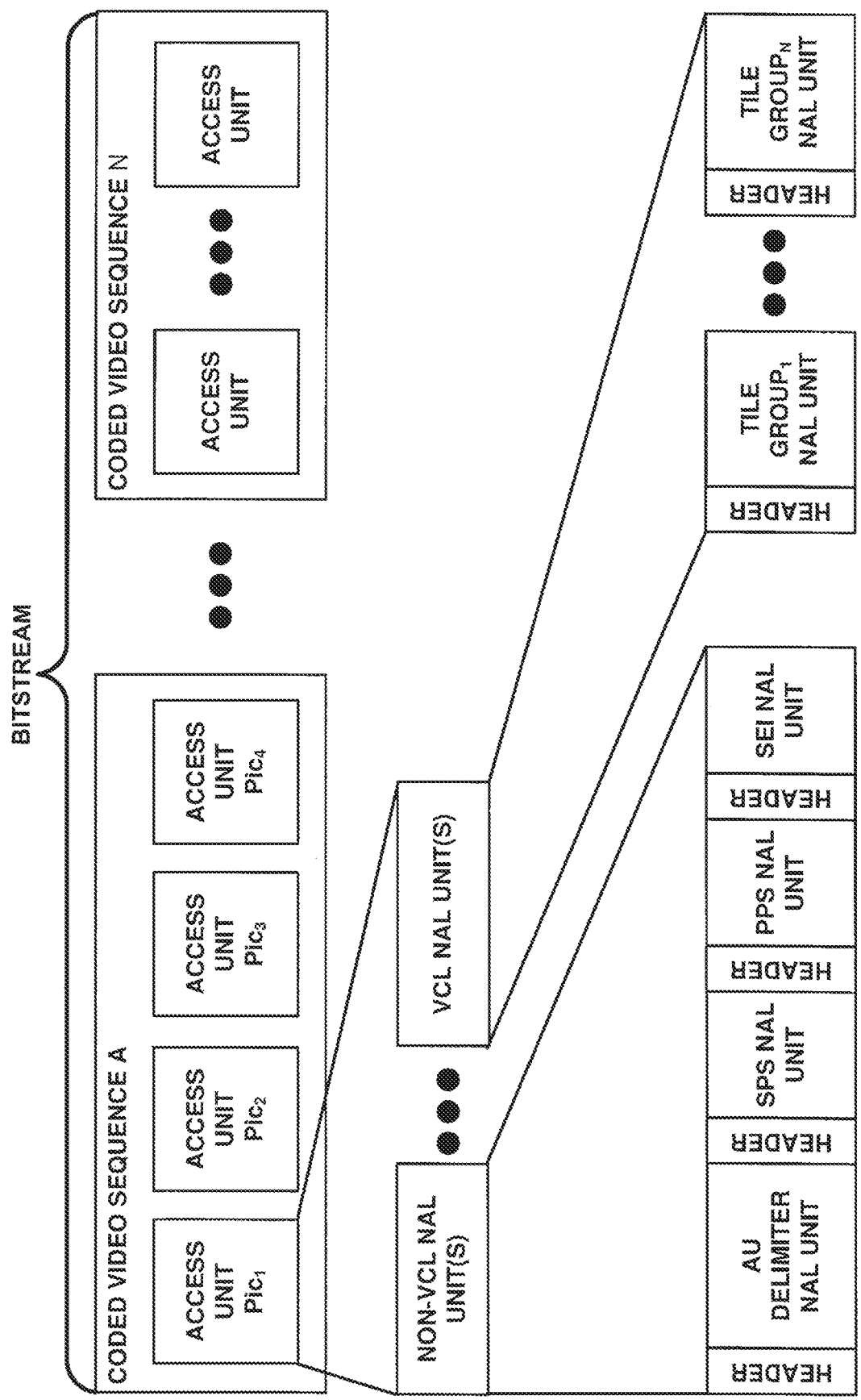
FIG. 3 is a conceptual diagram illustrating a data structure encapsulating coded video data and corresponding metadata according to one or more techniques of this this disclosure.

FIG. 3 illustrates an example of a bitstream including multiple CVSs, where a CVS is represented by NAL units included in a respective access unit. In the example illustrated in FIG. 3, non-VCL NAL units include respective parameter set NAL units (i.e., Sequence Parameter Sets (SPS), and Picture Parameter Set (PPS) units), an SEI message NAL unit, and an access unit delimiter NAL unit. JVET-M1001 defines NAL unit header semantics that specify the type of Raw Byte Sequence Payload (RBSP) data structure included in the NAL unit. Table 1 illustrates the syntax of the NAL unit header provided in JVET-M1001.

TABLE 1

| | Descriptor |
|---|---|
| nal_unit_header( ) { | |
|   forbidden_zero_bit | f(1) |
|   nal_unit_type | u(5) |
|   nuh_temporal_id_plus1 | u(3) |
|   nuh_reserved_zero_7bits | u(7) |
| } | |

JVET-M1001 provides the following definitions for the respective syntax elements illustrated in Table 1.

forbidden_zero_bit shall be equal to 0.

nuh_temporal_id_plus1 minus 1 specifies a temporal identifier for the NAL unit. The value of nuh_temporal_id_plus1 shall not be equal to 0.

The variable TemporalId is derived as follows:

TemporalId=nuh_temporal_id_plus1−1

When nal_unit_type is equal to IRAP_NUT, the coded tile group belongs to an IRAP picture, TemporalId shall be equal to 0.

The value of TemporalId shall be the same for all VCL NAL units of an access unit.

The value of TemporalId of a coded picture or an access unit is the value of the TemporalId of the VCL NAL units of the coded picture or the access unit.

The value of TemporalId for non-VCL NAL units is constrained as follows:

If nal_unit_type is equal to SPS_NUT, TemporalId shall be equal to 0 and the TemporalId of the access unit containing the NAL unit shall be equal to 0.

Otherwise, if nal_unit_type is equal to EOS_NUT or EOB_NUT, TernporalId shall be equal to 0.

Otherwise, TemporalId shall be greater than or equal to the TemporalId of the access unit containing the NAL unit.

NOTE—When the NAL unit is a non-VCL NAL unit, the value of TemporalId is equal to the minimum value of the TemporalId values of all access units to which the non-VCL NAL unit applies. When nal_unit_type is equal to PPS_NUT, TemporalId may be greater than or equal to the TemporalId of the containing access unit, as all picture parameter sets (PPSs) may be included in the beginning of a bitstream, wherein the first coded picture has TemporalId equal to 0. When nal_unit_type is equal to PREFIX_SEI_NUT or SUFFIX_SEI_NUT, TemporalId may be greater than or equal to the TemporalId of the containing access unit, as an SEI NAL unit may contain information that applies to a bitstream subset that includes access units for which the TemporalId values are greater than the TemporalId of the access unit containing the SEI NAL unit.

nuh_reserved_zero_7bits shall be equal to '0000000'. Other values of nuh_reserved_zero_7bits may be specified in the future. Decoders shall ignore (i.e. remove from the bitstream and discard) NAL units with values of nuh_reserved_zero_7bits not equal to '0000000'.

With respect to the syntax element nal_unit_type, nal_unit_type specifies the type of RBSP data structure contained in the NAL unit. Table 2 illustrates the NAL unit types provided in JVET-M1001.

TABLE 2

| nal_unit_type | Name of nal_unit_type | Content of NAL unit and RBSP syntax structure | NAL unit type class |
|---|---|---|---|
| 0 | NON_IRAP_NUT | Coded tile group of a non-IRAP picture tile_group_layer_rbsp( ) | VCL |
| 1 | IRAP_NUT | Coded tile group of an IRAP picture tile_group_layer_rbsp( ) | VCL |
| 2 . . . 15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22 . . . 26 | RSV_NVCL | Reserved | non-VCL |
| 27 . . . 31 | UNSPEC | Unspecified | non-VCL |

It should be noted that generally, for example with respect to ITU-T H.265, an IRAP a picture is a picture that does not refer to any pictures other than itself for inter prediction in its decoding process. Typically, the first picture in the bitstream in decoding order must be an IRAP picture. In ITU-T H.265, an IRAP picture may be a broken link access (BLA) picture, a clean random access (CRA) picture or an instantaneous decoder refresh (IDR) picture. ITU-T H.265 describes the concept of a leading picture, which is a picture that precedes the associated IRAP picture in output order. ITU-T H.265 further describes the concept of a trailing picture which is a non-IRAP picture that follows the associated IRAP picture in output order. Trailing pictures associated with an IRAP picture also follow the IRAP picture in decoding order. For IDR pictures, there are no trailing pictures that require reference to a picture decoded prior to the IDR picture. ITU-T H.265 provides where a CRA picture may have leading pictures that follow the CRA picture in decoding order and contain inter picture prediction references to pictures decoded prior to the CRA picture. Thus, when the CRA picture is used as a random access point these leading pictures may not be decodable and are identified as random access skipped leading (RASL) pictures. BLA pictures may also be followed by RASL pictures. These RASL pictures are always discarded for BLA pictures and discarded for CRA pictures when they are nondecodable, i.e., when a decoder that starts its decoding process at a CRA point. The other type of picture that can follow an IRAP picture in decoding order and precede it in output order is the random access decodable leading (RADL) picture, which cannot contain references to any pictures that precede the IRAP picture in decoding order. It should be noted that it has been agreed that the functionality of a CRA picture type will be added to JVET-M1001.

As described above, in JVET-M1001, non-VCL NAL units include respective parameter set NAL units. Table 3 illustrates the picture parameter set syntax provided in JVET-M1001.

TABLE 3

|  | Descriptor |
|---|---|
| pic_parameter_set_rbsp( ) { |  |
|   pps_pic_parameter_set_id | ue(v) |
|   pps_seq_parameter_set_id | ue(v) |
|   single_tile_in_pic_flag | u(1) |

TABLE 3-continued

|  | Descriptor |
|---|---|
|   if( !single_tile_in_pic_flag ) { |  |
|     num_tile_columns_minus1 | ue(v) |
|     num_tile_rows_minus1 | ue(v) |
|     uniform_tile_spacing_flag | u(1) |
|     if( !uniform_tile_spacing_flag ) { |  |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|     loop_filter_across_tiles_enabled_flag | u(1) |
|   } |  |
|   init_qp_minus26 | se(v) |
|   transform_skip_enabled_flag | u(1) |
|   if( transform_skip_enabled_flag ) |  |
|     log2_transform_skip_max_size_minus2 | ue(v) |
|   cu_qp_delta_enabled_flag | u(1) |
|   if( cu_qp_delta_enabled_flag ) |  |
|     diff_cu_qp_delta_depth | ue(v) |
|   pps_cb_qp_offset | se(v) |
|   pps_cr_qp_offset | se(v) |
|   pps_tile_group_chroma_qp_offsets_present_flag | u(1) |
|   deblocking_filter_control_present_flag | u(1) |
|   if( deblocking_filter_control_present_flag ) { |  |
|     deblocking_filter_override_enabled_flag | u(1) |
|     pps_deblocking_filter_disabled_flag | u(1) |
|     if( !pps_deblocking_filter_disabled_flag ) { |  |
|       pps_beta_offset_div2 | se(v) |
|       pps_tc_offset_div2 | se(v) |
|     } |  |
|   } |  |
|   rbsp_trailing_bits( ) |  |
| } |  |

With respect to Table 3, JVET-M1001 provides the following semantics:

pps_pic_parameter_set_id identifies the PPS for reference by other syntax elements. The value of pps_pic_parameter_set_id shall be in the range of 0 to 63, inclusive.

pps_seq_parameter_set_id specifies the value of sps_seq_parameter_set_id for the active SPS. The value of pps_seq_parameter_set_id shall be in the range of 0 to 15, inclusive.

single_tile_in_pic_flag equal to 1 specifies that there is only one tile in each picture referring to the PPS. single_tile_in_pic_flag equal to 0 specifies that there is more than one tile in each picture referring to the PPS.

It is a requirement of bitstream conformance that the value of single_tile_in_pic_flag shall be the same for all PPSs that are activated within a CVS.

num_tile_columns_minus1 plus 1 specifies the number of tile columns partitioning the picture. num_tile_columns_minus1 shall be in the range of 0 to PicWidthInCtbsY−1, inclusive. When not present, the value of num_tile_columns_minus1 is inferred to be equal to 0.

num_tile_rows_minus1 plus 1 specifies the number of tile rows partitioning the picture. num_tile_rows_minus1 shall be in the range of 0 to PicHeightInCtbsY−1, inclusive. When not present, the value of num_tile_rows_minus1 is inferred to be equal to 0.

The variable NumTilesInPic is set equal to (num_tile_columns_minus1+1)*(num_tile_rows_minus1+1).

When single_tile_in_pic_flag is equal to 0, NumTilesInPic shall be greater than 1.

uniform_tile_spacing_flag equal to 1 specifies that tile column boundaries and likewise tile row boundaries are distributed uniformly across the picture. uniform_tile_spacing_flag equal to 0 specifies that tile column boundaries and likewise tile row boundaries are not distributed uniformly across the picture but signalled explicitly using the syntax elements tile_column_width_minus1[i] and tile_row_height_minus1[i]. When not present, the value of uniform tile spacing flag is inferred to be equal to 1.

tile_column_width_minus1[i] plus 1 specifies the width of the i-th tile column in units of CTBs.

tile_row_height_minus1[i] plus 1 specifies the height of the i-th tile row in units of CTBs.

The following variables are derived by invoking the CTB raster and tile scanning conversion process:
  The list ColWidth[i] for i ranging from 0 to num_tile_columns_minus1, inclusive, specifying the width of the i-th tile column in units of CTBs,
  the list RowHeight[j] for j ranging from 0 to num_tile_rows_minus1, inclusive, specifying the height of the j-th tile row in units of CTBs,
  the list ColBd[i] for i ranging from 0 to num_tile_columns_minus1+1, inclusive, specifying the location of the i-th tile column boundary in units of CTBs,
  the list RowBd[j] for j ranging from 0 to num_tile_rows_minus1+1, inclusive, specifying the location of the j-th tile row boundary in units of CTBs,
  the list CtbAddrRsToTs[ctbAddrRs] for ctbAddrRs ranging from 0 to PicSizeInCtbsY−1, inclusive, specifying the conversion from a CTB address in the CTB raster scan of a picture to a CTB address in the tile scan,
  the list CtbAddrTsToRs[ctbAddrTs] for ctbAddrTs ranging from 0 to PicSizeInCtbsY−1, inclusive, specifying the conversion from a CTB address in the tile scan to a CTB address in the CTB raster scan of a picture,
  the list TileId[ctbAddrTs] for ctbAddrTs ranging from 0 to PicSizeInCtbsY−1, inclusive, specifying the conversion from a CTB address in tile scan to a tile ID,
  the list NumCtusInTile[tileIdx] for tileIdx ranging from 0 to PicSizeInCtbsY−1, inclusive, specifying the conversion from a tile index to the number of CTUs in the tile,
  the list FirstCtbAddrTs[tileIdx] for tileIdx ranging from 0 to NumTilesInPic−1, inclusive, specifying the conversion from a tile ID to the CTB address in tile scan of the first CTB in the tile,
  the lists ColumnWidthInLumaSamples[i] for i ranging from 0 to num_tile_columns_minus1, inclusive, specifying the width of the i-th tile column in units of luma samples,
  the list RowHeightInLumaSamples[j] for j ranging from 0 to num_tile_rows_minus1, inclusive, specifying the height of the j-th tile row in units of luma samples.

The values of ColumnWidthInLumaSamples[i] for i ranging from 0 to num_tile_columns_minus1, inclusive, and RowHeightInLumaSamples[j] for j ranging from 0 to num_tile_rows_minus1, inclusive, shall all be greater than 0.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations. When not present, the value of loop_filter_across_tiles_enabled_flag is inferred to be equal to 1.

init_qp_minus26 plus 26 specifies the initial value of $TileGroupQp_Y$ for each tile group referring to the PPS. The initial value of $TileGroupQp_Y$ is modified at the tile group layer when a non-zero value of tile_group_qp_delta is decoded. The value of init_qp_minus26 shall be in the range of $-(26+QpBdOffset_Y)$ to +37, inclusive.

transform_skip_enabled_flag equal to 1 specifies that transform_skip_flag may be present in the transform unit syntax. transform_skip_enabled_flag equal to 0 specifies that transform_skip_flag is not present in the transform unit syntax.

log 2_transform_skip_max_size_minus2 specifies the maximum block size used for transform skip, and shall be in the range of 0 to 3.

When not present, the value of log 2_transform_skip_max_size_minus2 is inferred to be equal to 0.

The variable MaxTsSize is set equal to 1<<(log 2_transform_skip_max_size_minus2+2).

cu_qp_delta_enabled_flag equal to 1 specifies that the diff_cu_qp_delta_depth syntax element is present in the PPS and that cu_qp_delta_abs may be present in the transform unit syntax. cu_qp_delta_enabled_flag equal to 0 specifies that the diff_cu_qp_delta_depth syntax element is not present in the PPS and that cu_qp_delta_abs is not present in the transform unit syntax.

diff_en_qp_delta_depth specifies the coding tree depth difference between the coding units of minimum coding tree depth and coding units of maximum coding tree depth that convey cu_qp_delta_abs and cu_qp_delta_sign_flag. The value range of diff_cu_qp_delta_depth is specified as follows:
  If tile_group_type is equal to I, the value of diff_cu_qp_delta_depth shall be in the range of 0 to log 2_ctu_size_minus2−log 2_min_qt_size_intra_tile_goup_minus2+MaxMttDepthY, inclusive.
  Otherwise (tile_group_type is not equal to 1), the value of diff_cu_qp_delta_depth shall be in the range of 0 to log 2_ctu_size_minus2−log 2_min_qt_size_inter_tile_group_minus2+MaxMttDepthY, inclusive.

When not present, the value of diff_cu_qp_delta_depth is inferred to be equal to 0.

pps_cb_qp_offset and pps_cr_qp_offset specify the offsets to the luma quantization parameter $Qp'_Y$ used for deriving $Qp'_{Cb}$ and $Qp'_{Cr}$, respectively. The values of pps_cb_qp_offset and pps_cr_qp_offset shall be in the range of −12 to +12, inclusive. When ChromaArrayType is equal to 0, pps_cb_qp_offset and pps_cr_qp_offset are not used in the decoding process and decoders shall ignore their value.

pps_tile_group_chroma_qp_offsets_present_flag equal to 1 indicates that the tile_group_cb_qp_offset and tile_group_cr_qp_offset syntax elements are present in the associated tile group headers. pps_tile_group_chroma_qp_offsets_present_flag equal to 0 indicates that these syntax elements are not present in the associated tile group headers. When ChromaArrayType is equal to 0, pps_tile_group_chroma_qp_offsets_pesent_flag shall be equal to 0.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of deblocking_filter_override_flag in the tile group headers for pictures referring to the PPS. deblocking_filter_override_enabled_flag equal to 0 specifies the absence of deblocking_filter_override_flag in the tile group headers for pictures referring to the PPS. When not present, the value of deblocking_filter_override_enabled_flag is inferred to be equal to 0.

pps_deblocking_flter_disabled_flag equal to 1 specifies that the operation of deblocking filter is not applied for tile groups referring to the PPS in which tile_group_deblocking_filter_disabled_flag is not present. pps_deblocking_filter_disabled_flag equal to 0 specifies that the operation of the deblocking filter is applied for tile groups referring to the PPS in which tile_group_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for $\beta$ and tC (divided by 2) that are applied for tile groups referring to the PPS, unless the default deblocking parameter offsets are overridden by the deblocking parameter offsets present in the tile group headers of the tile groups referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

As further described above, in JVET-M1001, a tile group may be associated with metadata that describes video coding properties. Table 4 illustrates that tile group header syntax provided in JVET-M1001.

TABLE 4

|  | Descriptor |
|---|---|
| tile_group_header( ) { |  |
|   tile_group_pic_parameter_set_id | ue(v) |
|   if( NumTilesInPic > 1 ) { |  |
|     tile_group_address | u(v) |
|     num_tiles_in_tile_group_minus1 | ue(v) |
|   } |  |
|   tile_group_type | ue(v) |
|   tile_group_pic_order_cnt_lsb | u(v) |
|   if( partition_constraints_override_enabled_flag ) { |  |
|     partition_constraints_override_flag | ue(v) |
|     if( partition_constraints_override_flag ) { |  |
|       tile_group_log2_diff_min_qt_min_cb_luma | ue(v) |
|       tile_group_max_mtt_hierarchy_depth_luma | ue(v) |
|       if( tile_group_max_mtt_hierarchy_depth_luma != 0 ) |  |
|         tile_group_log2_diff_max_bt_min_qt_luma | ue(v) |
|         tile_group_log2_diff_max_tt_min_qt_luma | ue(v) |
|       } |  |
|       if( tile_group_type = = I && qtbtt_dual_tree_intra_flag ) { |  |
|         tile_group_log2_diff_min_qt_min_cb_chroma | ue(v) |
|         tile_group_max_mtt_hierarchy_depth_chroma | ue(v) |
|         if( tile_group_max_mtt_hierarchy_depth_chroma != 0 ) |  |
|           tile_group_log2_diff_max_bt_min_qt_chroma | ue(v) |
|           tile_group_log2_diff_max_tt_min_qt_chroma | ue(v) |
|         } |  |
|       } |  |
|     } |  |
|   } |  |
|   if ( tile_group_type != I ) { |  |
|     if( sps_temporal_mvp_enabled_flag ) |  |
|       tile_group_temporal_mvp_enabled_flag | u(1) |
|     if( tile_group_type = = B ) |  |
|       mvd_l1_zero_flag | u(1) |
|     if( tile_group_temporal_mvp_enabled_flag ) { |  |
|       if( tile_group_type = = B ) |  |
|         collocated_from_l0_flag | u(1) |
|     } |  |
|     six_minus_max_num_merge_cand | ue(v) |
|     if( sps_affine_enable_flag ) |  |
|       five_minus_max_num_subblock_merge_cand | ue(v) |
|   } |  |
|   tile_group_qp_delta | se(v) |
|   if( pps_tile_group_chroma_qp_offsets_present_flag ) { |  |
|     tile_group_cb_qp_offset | se(v) |
|     tile_group_cr_qp_offset | se(v) |
|   } |  |
|   if( sps_sao_enabled_flag ) { |  |
|     tile_group_sao_luma_flag | u(1) |
|     if( ChromaArrayType != 0 ) |  |
|       tile_group_sao_chroma_flag | u(1) |
|   } |  |

TABLE 4-continued

| | Descriptor |
|---|---|
| if( sps_alf_enabled_flag ) { | |
|   tile_group_alf_enabled_flag | u(1) |
|   if( tile_group_alf_enabled_flag ) | |
|     alf_data( ) | |
| } | |
| if( tile_group_type = = P \|\| tile_group_type = = B ) { | |
|   num_ref_idx_l0_active_minus1 | ue(v) |
|   if( tile_group_type = = B ) | |
|     num_ref_idx_l1_active_minus1 | ue(v) |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   tile_group_deblocking_filter_disabled_flag | u(1) |
|   if( !tile_group_deblocking_filter_disabled_flag ) { | |
|     tile_group_beta_offset_div2 | se(v) |
|     tile_group_tc_offset_div2 | se(v) |
|   } | |
| } | |
| if( num_tiles_in_tile_group_minus1 > 0 ) { | |
|   offset_len_minus1 | ue(v) |
|   for( i = 0; i < num_tiles_in_tile_group_minus1; i++ ) | |
|     entry_point_offset_minus1[ i ] | u(v) |
| } | |
| byte_alignment( ) | |
| } | |

With respect to Table 4, JVET-M1001 provides the following semantics:

tile_group_pic_parameter_set_id specifies the value of pps_pic_parameter_set_id for the PPS in use. The value of tile_group_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to tile_group_pic_parameter_set_id.

tile_group_address specifies the tile address of the first tile in the tile group. The length of tile_group_address is Ceil(Log 2(NumTilesInPic)) bits. The value of tile_group_address shall be in the range of 0 to NumTilesInPic−1, inclusive, and the value of tile_group_address shall not be equal to the value of tile_group_address of any other coded tile group NAL unit of the same coded picture. When tile_group_address is not present it is inferred to be equal to 0.

num_tiles_in_tile_group_minus1 plus 1 specifies the number of tiles in the tile group. The value of num_tiles_in_tile_group_minus1 shall be in the range of 0 to NumTilesInPic−1, inclusive. When not present, the value of num_tiles_in_tile_group_minus1 is inferred to be equal to 0.

tile_group_type specifies the coding type of the tile group according to Table 5.

TABLE 5

| tile_group_type | Name of tile_group_type |
|---|---|
| 0 | B (B tile group) |
| 1 | P (P tile group) |
| 2 | I (I tile group) |

When nal_unit_type is equal to IRAP_NUT, i.e., the picture is an IRAP picture, tile_group_type shall be equal to 2.

tile_group_pic_order_cnt_lsb specifies the picture order count modulo MaxPicOrderCntLsb for the current picture. The length of the tile_group_pic_order_cnt_lsb syntax element is log 2_max_pic_order_cnt_lsb_minus4+4 bits. The value of the tile_group_pic_order_cnt_lsb shall be in the range of 0 to MaxPicOrderCntLsb−1, inclusive.

partition_constraints_override_flag equal to 1 specifies that partition constraint parameters are present in the tile group header. partition_constraints_override_flag equal to 0 specifies that partition constraint parameters are not present in the tile group header. When not present, the value of partition_constraints_override_flag is inferred to be equal to 0.

tile_group_log 2_diff_min_qt_min_cb_luma specifies the difference between the base 2 logarithm of the minimum size in luma samples of a luma leaf block resulting from quadtree splitting of a CTU and the base 2 logarithm of the minimum coding block size in luma samples for luma CUs in the current tile group. The value of tile_group_log 2_diff_min_qt_min_cb_luma shall be in the range of 0 to CtbLog 2SizeY−MinCbLog 2SizeY, inclusive. When not present, the value of tile_group_log 2_diff_min_qt_min_cb_luma is inferred as follows:

If tile_group_type equal to 2 (I), the value of tile_group_log 2_diff_min_qt_min_cb_luma is inferred to be equal to sps_log 2_diff_min_qt_min_cb_intra_tile_group_luma Otherwise (tile_group_type equal to 0 (B) or 1 (P)), the value of tile_group_log 2_diff_min_qt_min_cb_luma is inferred to be equal to sps_log 2_diff_min_qt_min_cb_inter_tile_group.

tile_group_max_mtt_hierarchy_depth_luma specifies the maximum hierarchy depth for coding units resulting from multi-type tree splitting of a quadtree leaf in the current tile group. The value of tile_group_max_mtt_hierarchy_depth_luma shall be in the range of 0 to CtbLog 2SizeY−MinCbLog 2SizeY, inclusive. When not present, the value of tile_group_max_mtt_hierarchy_depth_luma is inferred as follows:

If tile_group_type equal to 2 (I), the value of tile_group_max_mtt_hierarchy_depth_luma is inferred to be equal to sps_max_mtt_hierarchy_depth_intra_tile_group_luma Otherwise (tile_group_type equal to 0 (B) or 1 (P)), the value of tile_group_max_mtt_hierarchy_depth_luma is inferred to be equal to sps_max_mtt_hierarchy_depth_inter_tile_group.

tile_group_log 2_diff_max_bt_min_qt_luma specifies the difference between the base 2 logarithm of the maximum size (width or height) in luma samples of a luma coding block that can be split using a binary split and the minimum size (width or height) in luma samples of a luma leaf block resulting from quadtree splitting of a CTU in the current tile group. The value of tile_group_log 2_diff_max_bt_min_qt_luma shall be in the range of 0 to CtbLog 2SizeY−MinQtLog 2SizeY, inclusive. When not present, the value of tile_group_log 2_diff_max_bt_min_qt_luma is inferred as follows:

If tile_group_type equal to 2 (I), the value of tile_group_log 2_diff_max_bt_min_qt_luma is inferred to be equal to sps_log 2_diff_max_bt_min_qt_intra_tile_group_luma Otherwise (tile_group_type equal to 0 (B) or 1 (P)), the value of tile_group_log 2_diff_max_bt_min_qt_luma is inferred to be equal to sps_log 2_diff_max_bt_min_qt_inter_tile_group.

tile_group_log 2_diff_max_tt_min_qt_luma specifies the difference between the base 2 logarithm of the maximum size (width or height) in luma samples of a luma coding block that can be split using a ternary split and the minimum size (width or height) in luma samples of a luma leaf block resulting from quadtree splitting of a CTU in in the current tile group. The value of tile_group_log 2_diff_max_tt_min_qt_luma shall be in the range of 0 to CtbLog 2SizeY−MinQtLog 2SizeY, inclusive. When not present, the value of tile_group_log 2_diff_max_tt_min_qt_luma is inferred as follows:

If tile_group_type equal to 2 (I), the value of tile_group_log 2_diff_max_tt_min_qt_luma is inferred to be equal to sps_log 2_diff_max_tt_min_qt_intra_tile_group_luma Otherwise (tile_group_type equal to 0 (B) or 1 (P)), the value of tile_group_log 2_diff_max_tt_min_qt_luma is inferred to be equal to sps_log 2_diff_max_tt_min_qt_inter_tile_group.

til_group_log 2_diff_min_qt_min_cb_chroma specifies the difference between the base 2 logarithm of the minimum size in luma samples of a chroma leaf block resulting from quadtree splitting of a chroma CTU with treeType equal to DUAL_TREE_CHROMA and the base 2 logarithm of the minimum coding block size in luma samples for chroma CUs with treeType equal to DUAL_TREE_CHROMA in the current tile group. The value of tile_group_log 2_diff_min_qt_min_cb_chroma shall be in the range of 0 to CtbLog 2SizeY−MinCbLog 2SizeY, inclusive. When not present, the value of tile_group_log 2_diff_min_qt_min_cb_chroma is inferred to be equal to sps_log 2_diff_min_qt_min_cb_intra_tile_group_chroma.

tile_group_max_mtt_hierarchy_depth_chroma specifies the maximum hierarchy depth for coding units resulting from multi-type tree splitting of a quadtree leaf with treeType equal to DUAL_TREE_CHROMA in the current tile group. The value of tile_group_max_mtt_hierarchy_depth_chroma shall be in the range of 0 to CtbLog 2SizeY−MinCbLog 2SizeY, inclusive. When not present, the values of tile_group_max_mtt_hierarchy_depth_chroma is inferred to be equal to sps_max_mtt_hierarchy_depth_intra_tile_groups_chroma.

tile_group_log 2_diff_max_bt_min_qt_chroma specifies the difference between the base 2 logarithm of the maximum size (width or height) in luma samples of a chroma coding block that can be split using a binary split and the minimum size (width or height) in luma samples of a chroma leaf block resulting from quadtree splitting of a chroma CTU with treeType equal to DUAL_TREE_CHROMA in the current tile group. The value of tile_group_log 2_diff_max_bt_min_qt_chroma shall be in the range of 0 to CtbLog 2SizeY−MinQtLog 2SizeC, inclusive. When not present, the value of tile_group_log 2_diff_max_bt_min_qt_chroma is inferred to be equal to sps_log 2_diff_max_bt_min_qt_intra_tile_group_chroma tile_group_log 2_diff_max_t_min_qt_chroma specifies the difference between the base 2 logarithm of the maximum size (width or height) in luma samples of a chroma coding block that can be split using a ternary split and the minimum size (width or height) in luma samples of a chroma leaf block resulting from quadtree splitting of a chroma CTU with treeType equal to DUAL_TREE_CHROMA in the current tile group. The value of tile_group_log 2_diff_max_tt_min_qt_chroma shall be in the range of 0 to CtbLog 2SizeY−MinQtLog 2SizeC, inclusive. When not present, the value of tile_group_log 2_diff_max_tt_min_qt_chroma is inferred to be equal to sps_log 2_diff_max_tt_min_qt_intra_tile_group_chroma The variables MinQtLog 2SizeY, MinQtLog 2SizeC, MinQtSizeY, MinQtSizeC, MaxBtSizeY, MaxBtSizeC, MinBtSizeY, MaxTtSizeY, MaxTtSizeC, MinTtSizeY, MaxMttDepthY and MaxMttDepthC are derived as follows:

MinQtLog 2SizeY=MinCbLog 2SizeY+tile_group_log 2_diff_min_qt_min_cb_luma

MinQtLog 2SizeC=MinCbLog 2SizeY1+tile_group_log 2_diff_min_qt_min_cb_chroma

MinQtSizeY=1<<MinQtLog 2SizeY

MinQtSizeC=1<<MinQtLog 2SizeC

MaxBtSizeY=1<<(MinQtLog 2SizeY+tile_group_log 2_diff_max_bt_min_qt_luma)

MaxBtSizeC=1<<(MinQtLog 2SizeC+tile_group_log 2_diff_max_bt_min_qt_chroma)

MinBtSizeY=1<<MinCbLog 2SizeY

MaxTtSizeY=1<<(MinQtLog 2SizeY+tile_group_log 2_diff_max_tt_min_qt_luma)

MaxTtSizeC=1<<(MinQtLog 2SizeC+tile_group_log 2_diff_max_tt_min_qt_chroma)

MinTtSizeY−1<<MinCbLog 2SizeY

MaxMttDepthY=tile_group_max_mtt_hierarchy_depth_luma

MaxMttDepthC=tile_group_max_mtt_hierarchy_depth_chroma tile_group_temporal_mvp_enabled_flag specifies whether temporal motion vector predictors can be used for inter prediction. If tile_group_temporal_mvp_enabled_flag is equal to 0, the syntax elements of the current picture shall be constrained such that no temporal motion vector predictor is used in decoding of the current picture. Otherwise (tile_group_temporal_mvp_enabled_flag is equal to 1), temporal motion vector predictors may be used in decoding of the current picture. When not present, the value of tile_group_temporal_mvp_enabled_flag is inferred to be equal to 0.
mvd_l1_zero_flag equal to 1 indicates that the mvd_coding (x0, y0, 1) syntax structure is not parsed and MvdL1[x0][y0][compIdx] is set equal to 0 for compIdx=0 . . . 1. mvd_l1_zero_flag equal to 0 indicates that the mvd_coding (x0, y0, 1) syntax structure is parsed.

collocated_from_l0_flag equal to 1 specifies that the collocated picture used for temporal motion vector prediction is derived from reference picture list 0. collocated_from_l0_flag equal to 0 specifies that the collocated picture used for temporal motion vector prediction is derived from reference picture list 1. When collocated_from_l0_flag is not present, it is inferred to be equal to 1.

It is a requirement of bitstream conformance that the current decoded picture cannot be the collocated picture.

six_minus_max_num_merge_cand specifies the maximum number of merging motion vector prediction (MVP) candidates supported in the tile group subtracted from 6. The maximum number of merging MVP candidates, MaxNumMergeCand is derived as follows:

MaxNumMergeCand=6−six_minus_max_num_merge_cand

The value of MaxNumMergeCand shall be in the range of 1 to 6, inclusive.

five_minus_max_num_subblock_merge_cand specifies the maximum number of subblock-based merging motion vector prediction (MVP) candidates supported in the tile group subtracted from 5. When five_minus_max_num_subblock_merge_cand is not present, it is inferred to be equal to 5−sps_sbtmvp_enabled_flag. The maximum number of subblock-based merging MVP candidates, MaxNumSubblockMergeCand is derived as follows:

MaxNumSubblockMergeCand=5−five_minus_max_num_subblock_merge_cand

The value of MaxNumSubblockMergeCand shall be in the range of 0 to 5, inclusive.

tile_group_qp_delta specifies the initial value of $Qp_Y$ to be used for the coding blocks in the tile group until modified by the value of CuQpDeltaVal in the coding unit layer. The initial value of the $Qp_y$ quantization parameter for the tile group, $TileGroupQp_Y$, is derived as follows:

$$TileGroupQp_Y=26+init\_qp\_minus26+tile\_group\_qp\_delta$$

The value of $TileGroupQp_Y$ shall be in the range of $-QpBdOffset_Y$ to +63, inclusive.

tile_group_cb_qp_offset specifies a difference to be added to the value of pps_cb_qp_offset when determining the value of the $Qp'_{Cb}$ quantization parameter. The value of tile_group_cb_qp_offset shall be in the range of −12 to +12, inclusive. When tile_group_cb_qp_offset is not present, it is inferred to be equal to 0. The value of pps_cb_qp_offset+tile_group_cb_qp_offset shall be in the range of −12 to +12, inclusive.

til_group_cr_qp_offset specifies a difference to be added to the value of pps_cr_qp_offset when determining the value of the $Qp'_{Cr}$ quantization parameter. The value of tile_group_cr_qp_offset shall be in the range of −12 to +12, inclusive. When tile_group_cr_qp_offset is not present, it is inferred to be equal to 0. The value of pps_cr_qp_offset+tile_group_cr_qp_offset shall be in the range of −12 to +12, inclusive.

tile_group_sao_luma_flag equal to 1 specifies that SAO is enabled for the luma component in the current tile group; tile_group_sao_luma_flag equal to 0 specifies that SAO is disabled for the luma component in the current tile group. When tile_group_sao_luma_flag is not present, it is inferred to be equal to 0.

tile_group_sao_chroma_flag equal to 1 specifies that SAO is enabled for the chroma component in the current tile group; tile_group_sao_chroma_flag equal to 0 specifies that SAO is disabled for the chroma component in the current tile group. When tile_group_sao_chroma_flag is not present, it is inferred to be equal to 0.

tile_group_alf_enabled_flag equal to 1 specifies that adaptive loop filter is enabled and may be applied to Y, Cb, or Cr colour component in a tile group. tile_group_alf_enabled_flag equal to 0 specifies that adaptive loop filter is disabled for all colour components in a tile group.

num_ref_idx_l0_active_minus1 specifies the maximum reference index for reference picture list 0 that may be used to decode the tile group. num_ref_idx_l0_active_minus1 shall be in the range of 0 to 14, inclusive. When the current tile group is a P or B tile group and num_ref_idx_l0_active_minus1 is not present, num_ref_idx_l0_active_minus1 is inferred to be equal to num_ref_idx_l0_default_active_minus1.

The variable CurrPicIsOnlyRef, specifying that the current decoded picture is the only reference picture for the current tile group, is derived as follows:

```
CurrPicIsOnlyRef=sps_cpr_enabled_flag &&
    (tile_group_type==P) &&
    (num_ref_idx_l0_active_minus1==0)
``` num_ref_idx_l1_active_minus1 specifies the maximum reference index for reference picture list 1 that may be used to decode the tile group. num_ref_idx_l1_active_minus1 shall be in the range of 0 to 14, inclusive. When num_ref_idx_l1_active_minus1 is not present, num_ref_idx_l1_active_minus1 is inferred to be equal to num_ref_idx_l1_default_active_minus1.

dep_quant_enabled_flag equal to 0 specifies that dependent quantization is disabled. dep_quant_enabled_flag equal to 1 specifies that dependent quantization is enabled.

sign_data_hiding_enabled_flag equal to 0 specifies that sign bit hiding is disabled. sign_data_hiding_enabled_flag equal to 1 specifies that sign bit hiding is enabled. When sign_data_hiding_enabled_flag is not present, it is inferred to be equal to 0.

deblocking_filter_override_flag equal to 1 specifies that deblocking parameters are present in the tile group header. deblocking_filter_override_flag equal to 0 specifies that deblocking parameters are not present in the tile group header. When not present, the value of deblocking_filter_override_flag is inferred to be equal to 0.

tile_group_deblocking_filter_disabled_flag equal to 1 specifies that the operation of the deblocking filter is not applied for the current tile group. tile_group_deblocking_filter_disabled_flag equal to 0 specifies that the operation of the deblocking filter is applied for the current tile group. When tile_group_deblocking_filter_disabled_flag is not present, it is inferred to be equal to pps_deblocking_filter_disabled_flag.

tile_group_beta_offset_div2 and tile_group_tc_offset_div2 specify the deblocking parameter offsets for β and tC (divided by 2) for the current tile group. The values of tile_group_beta_offset_div2 and tile_group_tc_offset_div2 shall both be in the range of −6 to 6, inclusive. When not present, the values of tile_group_beta_offset_div2 and tile_group_tc_offset_div2 are inferred to be equal to pps_beta_offset_div2 and pps_tc_offset_div2, respectively.

offset_len_minus1 plus 1 specifies the length, in bits, of the entry_point_offset_minus1[i] syntax elements. The value of offset_len_minus1 shall be in the range of 0 to 31, inclusive.

entry_point_offset_minus1[i] plus 1 specifies the i-th entry point offset in bytes, and is represented by offset_len_minus1 plus 1 bits. The tile group data that follow the tile group header consists of num_tiles_in_tile_group_minus1+1 subsets, with subset index values ranging from 0 to num_tiles_in_tile_group_minus1, inclusive. The first byte of the tile group data is considered byte 0. When present, emulation prevention bytes that appear in the tile group data portion of the coded tile group NAL unit are counted as part of the tile group data for purposes of subset identification. Subset 0 consists of bytes 0 to entry_point_offset_minus1 [0], inclusive, of the coded tile group data, subset k, with k in the range of 1 to num_tiles_in_tile_group_minus1−1, inclusive, consists of bytes firstByte[k] to lastByte[k], inclusive, of the coded tile group data with firstByte[k] and lastByte[k] defined as:

firstByte[k]=$\Sigma_{n=1}^{k}$(entry_point_offset_minus1[n−1]+1)
lastByte[k]=firstByte[k]+entry_point_offset_minus1[k]

The last subset (with subset index equal to num_tiles_in_tile_group_minus1) consists of the remaining bytes of the coded tile group data.

Each subset shall consist of all coded bits of all CTUs in the tile group that are within the same tile.

This disclosure describes a so-called gradual random access picture and corresponding NAL unit, parameter set, and tile group level syntax and semantics. According to the techniques described herein, a video encoder may signal picture types and the like using the syntax and semantics described herein. A video decoder may determine picture types and the like by parsing signaling that uses the syntax and semantics described herein and perform video decoding based on the parsed signaling. Further, a process for generating a unavailable reference picture is described.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 4:
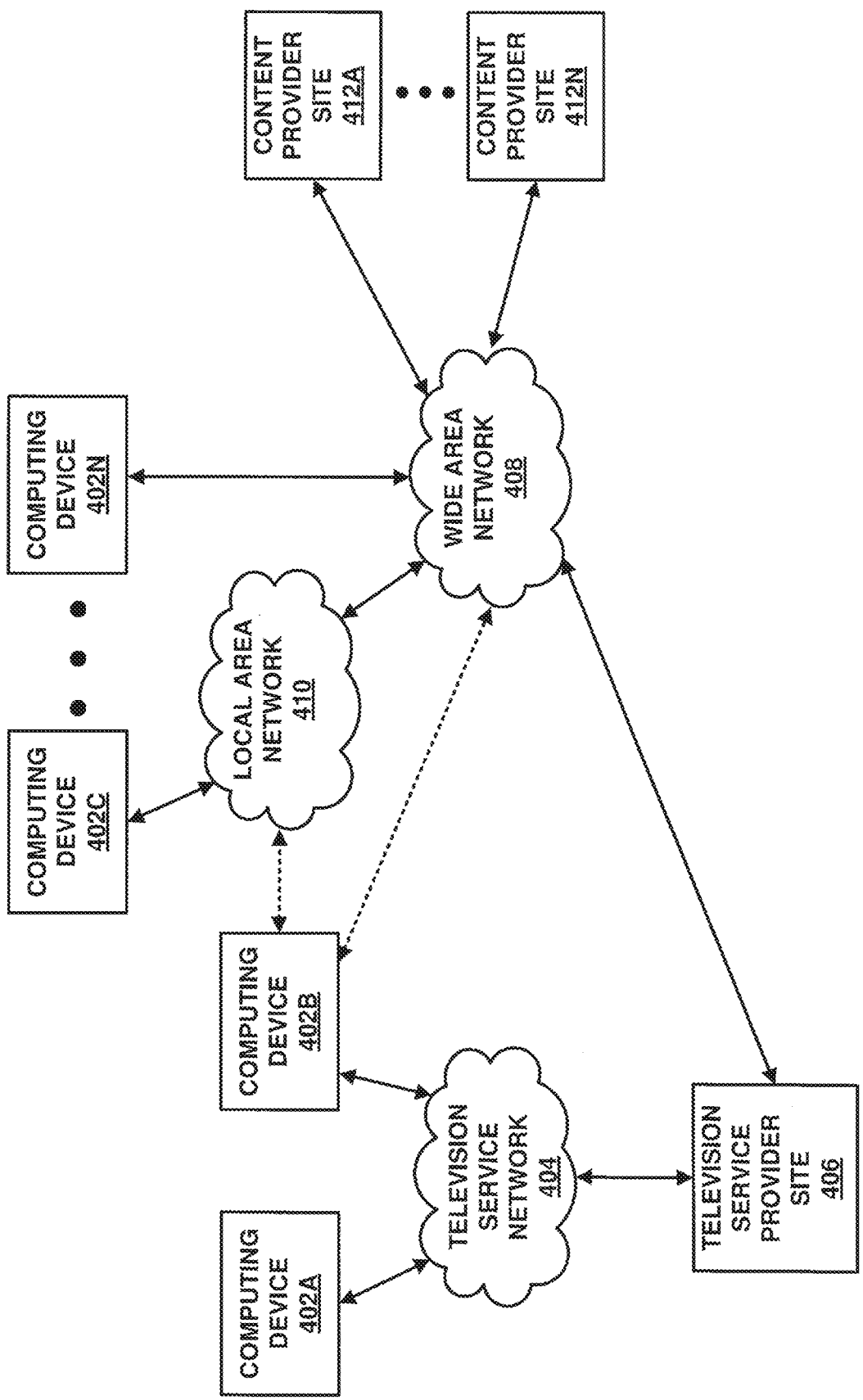
FIG. 4 is a conceptual drawing illustrating an example of components that may be included in an implementation of a system that may be configured to encode and decode video data according to one or more techniques of this this disclosure.

FIG. 4 is a conceptual drawing illustrating an example of components that may be included in an implementation of system 100. In the example implementation illustrated in FIG. 4, system 100 includes one or more computing devices 402A-402N, television service network 404, television service provider site 406, wide area network 408, local area network 410, and one or more content provider sites 412A-412N. The implementation illustrated in FIG. 4 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 4, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 4, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 4, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 4, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 5:
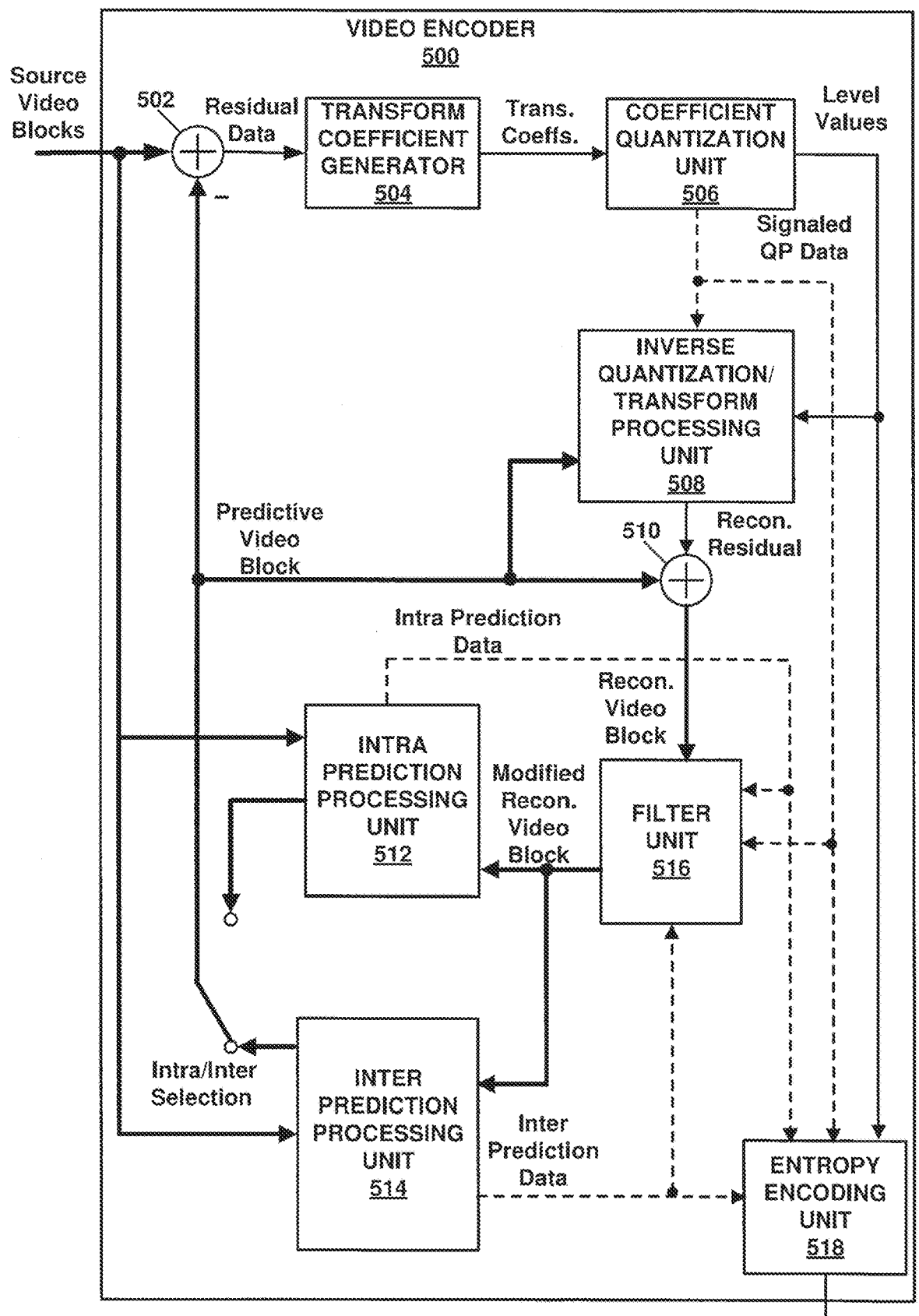
FIG. 5 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 5 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 5, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 5, video encoder 500 receives source video blocks and outputs a bitstream.

In the example illustrated in FIG. 5, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 5, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 5, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 5, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 5, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a predication mode).

Referring again to FIG. 5, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a PU of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 5). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 5, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 5, intra prediction processing unit 512 and inter prediction processing unit 514 may receive modified reconstructed video block via filter unit 216. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclose.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a ITU-T H.265 compliant bitstream forms a new ITU-T H.265 compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 4.

As described above, this disclosure describes a so-called gradual random access (GRA) picture. A GRA picture is an IRAP picture that may be used as a random access point and may have leading pictures that contain inter picture prediction references to pictures decoded prior to the GRA picture. In another example, a GRA picture is a non-IRAP picture which may be used as a start of a random access point and may have leading pictures that contain inter-prediction references to pictures decoded prior to the GRA picture. A GRA picture is different from a CRA picture in ITU-T H.265 as follows: A so-called clean random access can be performed at a CRA picture, i.e., when a random access is performed at a CRA picture, the pictures which follow the CRA picture in both the decoding order and output order when decoded will be an exact match to the corresponding pictures that would be produced by starting the decoding process at the location of a previous IRAP access unit or IRAP picture, if any, in the bitstream. In contrast, a so-called gradual random access can be performed at a GRA picture, i.e., when a random access is performed at a GRA picture, the pictures which follow the GRA picture in both the decoding order and output order when decoded will be an exact match to the corresponding pictures that would be produced by starting the decoding process at the location of a previous non-GRA IRAP access unit or non-GRA IRAP picture, if any, in the bitstream, only after a certain number of pictures as indicated in the syntax. Thus, when a random access is performed at a GRA picture, a certain number of pictures which follow the GRA picture in both the decoding order and output order when decoded, will not be an exact match to the corresponding pictures that would be produced by starting the decoding process at the location of a previous non-GRA IRAP access unit or non-GRA IRAP picture, if any, in the bitstream. Thus, additional syntax will be signaled in the bitstream to indicate which pictures are and which are not an exact match when random access is performed at a GRA picture.

In another example, a GRA picture may be defined as follows: An IRAP Picture for which each VCL NAL unit has a nal_unit_type equal to GRA_NUT, where a intra random access point (IRAP) picture is defined as follows: A coded picture for which each VCL NAL unit has nal_unit_type in the range of IDR_W_RADL to RSV_IRAP_VCL13, inclusive equal to IRAP_NUT.

For GRA pictures the NAL unit header may use the syntax illustrated in Table 1. For nal_unit_type, Table 5 illustrates the NAL unit types that may be used to enable a GRA picture.

TABLE 5

| nal_unit_type | Name of nal_unit_type | Content of NAL unit and RBSP syntax structure | NAL unit type class |
|---|---|---|---|
| 0 | TRAIL | Coded tile group of a non-STSA trailing picture tile_group_layer_rbsp( ) | VCL |
| 1 | STSA | Coded tile group of an STSA picture tile_group_layer_rbsp( ) | VCL |
| 2 | RADL | Coded tile group of a RADL picture tile_group_layer_rbsp( ) | VCL |
| 3 | RASL | Coded tile group of a RASL picture tile_group_layer_rbsp( ) | VCL |
| 4 . . . 7 | RSV_VCL_2 . . . RSV_VCL_7 | Reserved non-IRAP VCL NAL unit types | VCL |
| 8 | IDR_W_RADL | Coded tile group of an IDR picture tile_group_layer_rbsp( ) | VCL |
| 9 | IDR_N_LP | | |
| 10 | CRA_NUT | Coded tile group of a CRA picture tile_group_layer_rbsp( ) | VCL |
| 11 | GRA_NUT | Coded tile group of a Gradual Random Access picture tile_group_layer_rbsp( ) | VCL |
| 12 | RSV_IRAP_VCL12 | Reserved IRAP VCL NAL unit types | VCL |
| 13 | RSV_IRAP_VCL13 | | |
| 14 . . . 15 | RSV_VCL14 . . . RSV_VCL15 | Reserved non-IRAP VCL NAL unit types | VCL |
| 16 | DPS_NUT | Decoding parameter set decoding_parameter_set_rbsp( ) | non-VCL |
| 17 | SPS_NUT | Sequence parameter set seq_parameter_set_rbsp( ) | non-VCL |
| 18 | PPS_NUT | Picture parameter set pic_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22 | PREFIX_SEI_NUT | Supplemental enhancement information sei_rbsp( ) | non-VCL |
| 23 | SUFFIX_SEI_NUT | | |

TABLE 5-continued

| nal_unit_type | Name of nal_unit_type | Content of NAL unit and RBSP syntax structure | NAL unit type class |
|---|---|---|---|
| 24 . . . 27 | RSV_NVCL24 . . . RSV_NVCL27 | Reserved | non-VCL |
| 28 . . . 31 | UNSPEC28 . . . UNSPEC31 | Unspecified | non-VCL |

Further, syntax element nuh_temporal_id_plus1 may be modified to include the following constraint: When nal_unit_type is equal to GRA_NUT, TemporalId shall be equal to 0. It should be noted that in another example, GRA_NUT may be a non-VCL NAL unit. It should be noted that in another example the GRA_NUT may have a TemporalId greater than 0.

In one example, a flag may be included in the PPS to indicate if a flag (or other syntax elements) which provides GRA pictures information is signaled in tile group header (or in some part of the picture bitstream data). Further, a tile group header (or some other part of picture bitstream data) may include conditional or unconditional signaling of a flag which provides GRA pictures information. Table 6 illustrates an example a picture parameter set syntax for enabling GRA pictures according to the techniques herein. Table 7 illustrates an example of tile group header syntax for enabling GRA pictures according to the techniques herein.

TABLE 6

| | Descriptor |
|---|---|
| pic_parameter_set_rbsp( ) { | |
|   pps_pic_parameter_set_id | ue(v) |
|   pps_seq_parameter_set_id | ue(v) |
|   output_flag_present_flag | u(1) |
|     gra_flag_present_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |

TABLE 6-continued

| | Descriptor |
|---|---|
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     loop_fiiter_across_tiles_enabled_flag | u(1) |
|   } | |
|   init_qp_minus26 | se(v) |
|   transform_skip_enabled_flag | u(1) |
|   if( transform_skip_enabled_flag ) | |
|     log2_transform_skip_max_size_minus2 | ue(v) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_tile_group_chroma_qp_offsets_present_flag | u(1) |
|   deblocking_filter_control_present_flag | u(1) |
|   if( deblocking_filter_control_present_flag ) { | |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|     } | |
|   } | |
|   rbsp_trailing_bits( ) | |
| } | |

TABLE 7

| | Descriptor |
|---|---|
| tile_group_header( ) { | |
|   tile_group_pic_parameter_set_id | ue(v) |
|   if( NumTilesInPic > 1 ) { | |
|     tile_group_address | u(v) |
|     num_tiles_in_tile_group_minus1 | ue(v) |
|   } | |
|   tile_group_type | ue(v) |
|   if(output_flag_present_flag ) | |
|     pic_output_flag | u(1) |
|   if( gra_flag_present_flag ) | |
|     gra_output_flag | u(1) |
|   tile_group_pic_order_cnt_lsb | u(v) |
|   if( partition_constraints_override_enabled_flag ) { | |
|     partition_constraints_override_flag | ue(v) |
|     if( partition_constraints_override_flag ) { | |
|       tile_group_log2_diff_min_qt_min_cb_luma | ue(v) |
|       tile_group_max_mtt_hierarchy_depth_luma | ue(v) |
|       if( tile_group_max_mtt_hierarchy_depth_luma != 0 ) | |
|         tile_group_log2_diff_max_bt_min_qt_luma | ue(v) |
|         tile_group_log2_diff_max_tt_min_qt_luma | ue(v) |
|     } | |
|     if( tile_group_type == I && qtbtt_dual_tree_intra_flag ) { | |
|       tile_group_log2_diff_min_qt_min_cb_chroma | ue(v) |
|       tile_group_max_mtt_hierarchy_depth_chroma | ue(v) |

TABLE 7-continued

| | Descriptor |
|---|---|
|           if( tile_group_max_mtt_hierarchy_depth_chroma != 0 ) | |
|             tile_group_log2_diff_max_bt_min_qt_chroma | ue(v) |
|             tile_group_log2_diff_max_tt_min_qt_chroma | ue(v) |
|           } | |
|         } | |
|       } | |
|     } | |
|   if ( tile_group_type != I ) { | |
|     if( sps_temporal_mvp_enabled_flag ) | |
|       tile_group_temporal_mvp_enabled_flag | u(1) |
|     if( tile_group_type = = B ) | |
|       mvd_l1_zero_flag | u(1) |
|     if( tile_group_temporal_mvp_enabled_flag ) { | |
|       if( tile group type = = B ) | |
|         collocated_from_l0_flag | u(1) |
|     } | |
|     six_minus_max_num_merge_cand | ue(v) |
|     if( sps_affine_enable_flag ) | |
|       five_minus_max_num_subblock_merge_cand | ue(v) |
|   } | |
|   tile_group_qp_delta | se(v) |
|   if( pps_tile_group_chroma_qp_offsets_present_flag ) { | |
|     tile_group_cb_qp_offset | se(v) |
|     tile_group_cr_qp_offset | se(v) |
|   } | |
|   if( sps_sao_enabled_flag ) { | |
|     tile_group_sao_luma_flag | u(1) |
|     if( ChromaArrayType != 0 ) | |
|       tile_group_sao_chroma_flag | u(1) |
|   } | |
|   if( sps_alf_enabled_flag ) { | |
|     tile_group_alf_enabled_flag | u(1) |
|     if( tile_group_alf_enabled_flag ) | |
|       alf_data( ) | |
|   } | |
|   if( tile_group_type = = P \|\| tile_group_type = = B ) { | |
|     num_ref_idx_l0_active_minus1 | ue(v) |
|     if( tile_group_type = = B ) | |
|       num_ref_idx_l1_active_minus1 | ue(v) |
|   } | |
|   dep_quant_enabled_flag | u(1) |
|   if( !dep_quant_enabled_flag ) | |
|     sign_data_hiding_enabled_flag | u(1) |
|   if( deblocking_filter_override_enabled_flag ) | |
|     deblocking_filter_override_flag | u(1) |
|   if( deblocking_filter_override_flag ) { | |
|     tile_group_deblocking_filter_disabled_flag | u(1) |
|     if( !tile_group_deblocking_filter_disabled_flag ) { | |
|       tile_group_beta_offset_div2 | se(v) |
|       tile_group_tc_offset_div2 | se(v) |
|     } | |
|   } | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[ i ] | u(v) |
|   } | |
|   byte_alignment( ) | |
| } | |

With respect to Table 6 the semantics may be based on the semantics provided above with respect to Table 3, for syntax elements output_flag_present and gra_flag_present_flag, in one example, the following semantics may be used:

output_flag_present equal to 1 indicates that the pic_output_flag syntax element is present in the associated tile group headers. output_flag_present equal to 0 indicates that the pic_output_flag syntax element is not present in the associated tile group headers.

gra_flag_present_flag equal to 1 indicates that the gra_output_flag syntax element is present in the associated tile group headers. gra_flag_present_flag equal to 0 indicates that the gra_output_flag syntax element is not present in the associated tile group headers.

With respect to Table 7 the semantics may be based on the semantics provided above with respect to Table 4, for syntax elements pic_output_flag and gra_output_flag, in one example, the following semantics may be used:

pic_output_flag affects the decoded picture output and removal processes. When pic_output_flag is not present, it is inferred to be equal to 1.

In one example, the decoded picture output and removal processes may be as specified in Annex C of ITU-T H.265. Annex C of ITU-T H.265 generally describes specifies the hypothetical reference decoder (HRD) and its use to check bitstream and decoder conformance. In other examples, the decoded picture output and removal processes may be similar to but not exactly same as Annex C of ITU-T H.265.

In one example, generally, when pic_output_flag is equal to 1, the picture is output and when pic_output_flag is equal to 0, the picture is not output.

gra_output_flag is used to derive PicOutputFlag and affects the decoded picture output and removal processes. When gra_output_flag is not present, it is inferred to be equal to 1. In another example: When gra_output_flag is not present, it is inferred to be equal to 0.

In one example, the following semantics may be used for gra_output_flag:

gra_output_flag is used to derive PicOutputFlag and affects the decoded picture output and removal processes as specified (for example, based on in Annex C of ITU-T H.265, as described above). When gra_output_flag is not present, it is inferred to be equal to 1. In another example: When gra_output_flag is not present, it is inferred to be equal to 0.

In one example, the following semantics may be used for gra_output_flag:

gra_output_flag equal to 1 specifies that if decoding process was started at the previous GRA picture that precedes the current picture, either because the previous GRA picture is the first picture in the CVS or if a random access is performed at that GRA picture, the current decoded picture is an exact match to the picture produced by starting the decoding process at the previous non-GRA IRAP picture (or in another example, at the previous IDR picture) preceding the current picture. gra_output_flag equal to 0 specifies that if decoding process was started at the previous GRA picture that precedes the current picture, either because the previous GRA picture is the first picture in the CVS or if a random access is performed at that GRA picture, the current decoded picture is not (variant: or may or may not be) an exact match to the picture produced by starting the decoding process at the previous non-GRA IRAP picture (or in another example, at the previous IDR picture) preceding the current picture. When gra_output_flag is not present, it is inferred to be equal to 1. In another example: When gra_output_flag is not present, it is inferred to be equal to 0.

In one example, the condition for signaling gra_output_flag in the tile group header of Table 7 may be modified as follows:

```
...
   if( gra_flag_present_flag && (nal_unit_type <
IDR_W_RADL || (nal_unit_type > RSV_IRAP_VCL13 &&
nal_unit_type >=RSV_VCL15)) )
      gra_output_flag                                    u(1)
...
```

Thus, the gra_output_flag may be signaled only for non-RAP VCL NAL units. In one example, instead of a separate flag to indicate GRA picture information, a 2-bit indicator may be signaled to indicate GRA picture information and picture output information. For example, output_flag_present and gra_flag_present_flag in the PPS syntax of Table 6 may be replaced with a u(1) a syntax element output_idc_present_flag and syntax elements pic_output_flag and gra_output_flag in the tile group header syntax of Table 7 may be replaced with a u(2) a syntax element pic_output_idc, where, in one example, output_idc_present_flag and pic_output_idc have the following semantics:

output_idc_present_flag equal to 1 indicates that the pic_output_idc syntax element is present in the associated tile group headers. output_idc_present_flag equal to 0 indicates that the pic_output_idc syntax element is not present in the associated tile group headers.

pic_output_idc is used to derive PicOutputFlag and affects the decoded picture output and removal processes as specified (for example, based on in Annex C of ITU-T H.265, as described above). When pic_output_idc is not present, it is inferred to be equal to 01. In another example: When pic_output_idc is not present, it is inferred to be equal to 11. In another example: When pic_output_idc is not present, it is inferred to be equal to 00. In another example: When pic_output_idc is not present, it is inferred to be equal to 10.

In one example, one or more of the syntax elements recovery_poc_cnt, exact_match_flag and broken_link_flag may be signaled conditionally in the tile group header of a GRA picture, for example as illustrated in Table 9.

TABLE 9

|  | Descriptor |
|---|---|
| tile_group_header( ) { |  |
|    tile_group_pic_parameter_set_id | ue(v) |
|    if( NumTilesInPic > 1 ) { |  |
|      tile_group_address | u(v) |
|      num_tiles_in_tile_group_minus1 | ue(v) |
|    } |  |
|    tile_group_type | ue(v) |
|    if(output_flag_present_flag ) |  |
|      pic_output_flag | u(1) |
|    if( nal_unit_Type == GRA_NUT ) { |  |
|      recovery_poc_cnt | se(v) |
|      exact_match_flag | u(1) |
|      broken_link_flag | u(1) |
|    } |  |
|    tile_group_pic_order_cnt_lsb | u(v) |
|    if( partition_constraints_override_enabled_flag ) { |  |
|      partition_constraints_override_flag | ue(v) |
|      if( partition_constraints_override_flag ) { |  |
|         tile_group_log2_diff_min_qt_min_cb_luma | ue(v) |
|         tile_group_max_mtt_hierarchy_depth_luma | ue(v) |

TABLE 9-continued

| | Descriptor |
|---|---|
| if( tile_group_max_mtt_hierarchy_depth_luma != 0 ) | |
|     tile_group_log2_diff_max_bt_min_qt_luma | ue(v) |
|     tile_group_log2_diff_max_tt_min_qt_luma | ue(v) |
| } | |
| if( tile_group_type == I && qtbtt_dual_tree_intra_flag ) { | |
|     tile_group_log2_diff_min_qt_min_cb_chroma | ue(v) |
|     tile_group_max_mtt_hierarchy_depth_chroma | ue(v) |
|     if( tile_group_max_mtt_hierarchy_depth_chroma != 0 ) | |
|         tile_group_log2_diff_max_bt_min_qt_chroma | ue(v) |
|         tile_group_log2_diff_max_tt_min_qt_chroma | ue(v) |
|     } | |
|   } | |
| } | |
| } | |
| if ( tile_group_type != I ) { | |
|   if( sps_temporal_mvp_enabled_flag ) | |
|     tile_group_temporal_mvp_enabled_flag | u(1) |
|   if( tile_group_type == B ) | |
|     mvd_l1_zero_flag | u(1) |
|   if( tile_group_temporal_mvp_enabled_flag ) { | |
|     if( tile_group_type == B ) | |
|         collocated_from_l0_flag | u(1) |
|   } | |
|   six_minus_max_num_merge_cand | ue(v) |
|   if( sps_affine_enable_flag ) | |
|     five_minus_max_num_subblock_merge_cand | ue(v) |
| } | |
| tile_group_qp_delta | se(v) |
| if( pps_tile_group_chroma_qp_offsets_present_flag ) { | |
|   tile_group_cb_qp_offset | se(v) |
|   tile_group_cr_qp_offset | se(v) |
| } | |
| if( sps_sao_enabled_flag ) { | |
|   tile_group_sao_luma_flag | u(1) |
|   if( ChromaArrayType != 0 ) | |
|     tile_group_sao_chroma_flag | u(1) |
| } | |
| if( sps_alf_enabled_flag ) { | |
|   tile_group_alf_enabled_flag | u(1) |
|   if( tile_group_alf_enabled_flag ) | |
|     alf_data( ) | |
| } | |
| if( tile_group_type == P || tile_group_type == B ) { | |
|   num_ref_idx_l0_active_minus1 | ue(v) |
|   if( tile_group_type == B ) | |
|     num_ref_idx_l1_active_minus1 | ue(v) |
| } | |
| dep_quant_enabled_flag | u(1) |
| if( !dep_quant_enabled_flag ) | |
|   sign_data_hiding_enabled_flag | u(1) |
| if( deblocking_filter_override_enabled_flag ) | |
|   deblocking_filter_override_flag | u(1) |
| if( deblocking_filter_override_flag ) { | |
|   tile_group_deblocking_filter_disabled_flag | u(1) |
|   if( !tile_group_deblocking_filter_disabled_flag ) { | |
|     tile_group_beta_offset_div2 | se(v) |
|     tile_group_tc_offset_div2 | se(v) |
|   } | |
| } | |
| if( num_tiles_in_tile_group_minus1 > 0 ) { | |
|   offset_len_minus1 | ue(v) |
|   for( i = 0; i < num_tiles_in_tile_group_minus1; i++ ) | |
|     entry_point_offset_minus1[ i ] | u(v) |
| } | |
| byte_alignment( ) | |
| } | |

With respect to Table 9 the semantics may be based on the semantics provided above with respect to Table 4, for syntax elements recovery_poc_cnt, exact_match_flag, and broken_link_flag, in one example, the following semantics may be used: recovery_poc_cnt specifies the recovery point of decoded pictures in output order. If there is a picture picA that follows the current GRA picture in decoding order in the CVS and that has PicOrderCntVal equal to the PicOrderCntVal of the current GRA picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GRA picture in decoding order. All decoded pictures in output order are indicated to be correct or approximately correct in content starting at the output order position of the recovery point picture. The value of recovery_poc_cnt shall be in the range of −MaxPicOrderCntLsb/2 to MaxPicOrderCntLsb/2−1, inclusive.

The variable RPPicOrderCntVal is derived as follows:

RPPicOrderCntVal=PicOrderCntlVal+recovery_poc_cnt exact_match_flag indicates whether decoded pictures at and subsequent to the specified recovery point in output order derived by starting the decoding process at the access unit associated with the current GRA picture will be an exact match to the pictures that would be produced by starting the decoding process at the location of a previous non-GRA IRAP access unit, if any, in the bitstream. The value 0 indicates that the match may not be exact and the value 1 indicates that the match will be exact. When exact_match_flag is equal to 1, it is a requirement of bitstream conformance that the decoded pictures at and subsequent to the specified recovery point in output order derived by starting the decoding process at the access unit associated with the current GRA picture shall be an exact match to the pictures that would be produced by starting the decoding process at the location of a previous non-GRA IRAP access unit, if any, in the bitstream.

When exact_match_flag is equal to 0, the quality of the approximation at the recovery point is chosen by the encoding process and is not specified in this Specification.

broken_ink_flag indicates the presence or absence of a broken link in the NAL unit stream at the location of the current GRA picture and is assigned further semantics as follows:

If broken_link_flag is equal to 1, pictures produced by starting the decoding process at the location of a previous non-GRA IRAP access unit may contain undesirable visual artefacts to the extent that decoded pictures at and subsequent to the access unit associated with the current GRA picture in decoding order should not be displayed until the specified recovery point in output order.

Otherwise (broken_link_flag is equal to 0), no indication is given regarding any potential presence of visual artefacts.

Regardless of the value of the broken_link_flag, pictures subsequent to the specified recovery point in output order are specified to be correct or approximately correct in content.

In one example, according to the techniques herein, the decoding a picture may be as follows:

Input to this process is a bitstream. Output of this process is a list of decoded pictures.

The decoding process is specified such that all decoders that conform to a specified profile and level will produce numerically identical cropped decoded output pictures when invoking the decoding process associated with that profile for a bitstream conforming to that profile and level. Any decoding process that produces identical cropped decoded output pictures to those produced by the process described herein (with the correct output order or output timing, as specified) conforms to the decoding process requirements.

At the beginning of decoding a CVS, after activating the SPS RBSP that is active for the entire CVS and before decoding any VCL NAL units of the CVS, CVS decoding process is invoked with the CVS as input.

CVS Decoding Process

Input to this process is a CVS. Output of this process is a list of decoded pictures. The variable HighestTid, which identifies the highest temporal sub-layer to be decoded, is specified as follows:

If some external means, not specified in this Specification, is available to set HighestTid, HighestTid is set by the external means.

Otherwise, HighestTid is set equal to sps_max_sub_layers_minus1.

A sub-bitstream extraction process is applied with the CVS and HighestTid as inputs, and the output is assigned to a bitstream referred to as BitstreamToDecode.

Decoding process for a coded picture is repeatedly invoked for each coded picture in BitstreamToDecode in decoding order.

Decoding process for a coded picture

The decoding processes specified in this clause apply to each coded picture, referred to as the current picture and denoted by the variable CurrPic, in BitstreamToDecode.

Depending on the value of chroma_format_idc, the number of sample arrays of the current picture is as follows:

If chroma_format_idc is equal to 0, the current picture consists of 1 sample array $S_L$.

Otherwise (chroma_format_idc is not equal to 0), the current picture consists of 3 sample arrays $S_L$, $S_{Cb}$, $S_{Cr}$.

The decoding process for the current picture takes as inputs the syntax elements and upper-case variables from the defined syntax. When interpreting the semantics of each syntax element in each NAL unit, the term "the bitstream" (or part thereof, e.g., a CVS of the bitstream) refers to BitstreamToDecode (or part thereof).

When the current picture is an IRAP picture, the following applies:

If the current picture is an IDR picture, the first picture in the bitstream in decoding order, or the first picture that follows an end of sequence NAL unit in decoding order, the variable NoRaslOutputFlag is set equal to 1.

Otherwise, if some external means not specified in this Specification is available to set the variable HandleCraAsCvsStartFlag to a value for the current picture, the variable HandleCraAsCvsStartFlag is set equal to the value provided by the external means and the variable NoRaslOutputFlag is set equal to HandleCraAsCvsStartFlag.

Otherwise, the variable HandleCraAsCvsStartFlag is set equal to 0 and the variable NoRaslOutputFlag is set equal to 0.

Depending on the value of separate_colour_plane_flag, the decoding process is structured as follows:

If separate_colour_plane_flag is equal to 0, the decoding process is invoked a single time with the current picture being the output.

Otherwise (separate_colour_plane_flag is equal to 1), the decoding process is invoked three times. Inputs to the decoding process are all NAL units of the coded picture with identical value of colour_plane_id. The decoding process of NAL units with a particular value of colour_plane_id is specified as if only a CVS with monochrome colour format with that particular value of colour_plane_id would be present in the bitstream. The output of each of the three decoding processes is assigned to one of the 3 sample arrays of the current picture, with the NAL units with colour_plane_id equal to 0, 1 and 2 being assigned to $S_L$, $S_{Cb}$ and $S_{Cr}$, respectively.

When the current picture is GRA picture, the following applies:
  If the current picture is a GRA picture, and is the first picture in the CVS or if a random access is started at the current picture, the variable GraFlag is set equal to 1.
  Otherwise, the variable GraFlag is set equal to 0.

The decoding process operates as follows for the current picture CurrPic:
1. The decoding of NAL units is invoked.
2. The processes specify decoding processes using syntax elements in in the tile group layer and above is invoked.
   a. When the current picture is a GRA picture with GraFlag equal to 1, the decoding process for generating unavailable reference pictures specified below is invoked, which needs to be invoked only for the first tile group of a picture.
   b. When the current picture is a CRA picture with NoRaslOutputFlag equal to 1, the decoding process for generating unavailable reference pictures specified in below is invoked, which needs to be invoked only for the first tile group of a picture.
3. In one example:
   PicOutputFlag is set as follows:
     If the current picture is a RASL picture and NoRaslOutputFlag of the associated IRAP picture is equal to 1, PicOutputFlag is set equal to 0.
     Otherwise if GraFlag is equal to 1 and gra_output_flag is equal to 0, PicOutputFlag is set equal to gra_output_flag (i.e. it is set equal to 0).
     Otherwise, (i.e. if GraFlag is equal to 0 or GraFlag is equal to 1 and gra_output_flag is equal to 1), PicOutputFlag is set equal to pic_output_flag.
   In another example:
   PicOutputFlag is set as follows:
     If the current picture is a RASL picture and NoRaslOutputFlag of the associated IRAP picture is equal to 1, PicOutputFlag is set equal to 0.
     Otherwise if GraFlag is equal to 1 and pic_output_idc is equal to 00 or 01, PicOutputFlag is set equal to 0. (This can be alternatively written as: Otherwise if GraFlag is equal to 1 and pic_output_idc&10 is equal to 00, PicOutputFlag is set equal to 0)
     Otherwise, (i.e. if GraFlag is equal to 0 or GraFlag is equal to 1 and pic_output_idc is equal to 10 or 11), PicOutputFlag is set equal to pic_output_flag.
   In another example:
   PicOutputFlag is set as follows:
     If the current picture is a RASL picture and NoRaslOutputFlag of the associated IRAP picture is equal to 1, PicOutputFlag is set equal to 0.
     Otherwise if GraFlag is equal to 1 and PicOrderCntVal of the current picture is less than RPPicOrderCntVal, PicOutputFlag is set equal to 0.
     Otherwise, (i.e. if GraFlag is equal to 0 or GraFlag is equal to 1 and gra_output_flag is equal to 1), PicOutputFlag is set equal to pic_output_flag.
   In another example:
   PicOutputFlag is set as follows:
     If the current picture is a RASL picture and NoRaslOutputFlag of the associated IRAP picture is equal to 1, PicOutputFlag is set equal to 0.
     Otherwise if GraFlag is equal to 1 and PicOutputFlag is set equal to gra_output_flag.
     Otherwise, if GraFlag is equal to 0, PicOutputFlag is set equal to pic_output_flag.
   In another example:
   PicOutputFlag is set as follows:
     If the current picture is a RASL picture and NoRaslOutputFlag of the associated IRAP picture is equal to 1, PicOutputFlag is set equal to 0.
     Otherwise, PicOutputFlag is set equal to pic_output_flag.
4. If GraFlag is equal to 1, following applies:
   According to the corresponding respective example in 3, above:
   In one example:
     If gra_output_flag is equal to 1, GraFlag is set equal to 0.
   In one example:
     If gra_output_idc is equal to 10 or 11, GraFlag is set equal to 0.
   In one example:
     If gra_output_flag is equal to 1, PicOrderCntVal of the current picture is greater than or equal to RPPicOrderCntVal, GraFlag is set equal to 0.
5. The processes in clauses specify decoding processes using syntax elements in all syntax structure layers.

When starting a CVS with CRA and/or GRA pictures, a decoding process for generation of unavailable reference pictures should be specified for conformance purpose. In one example, a process for generating unavailable reference pictures may be as follows:

This process is invoked once per coded picture when the current picture is a CRA picture with NoRaslOutputFlag equal to 1.

When this process is invoked, the following applies:
  For each RefPicList[i][j], with i in the range of 0 to 1, inclusive, for j in the range of 0 to num_ref_entries[i][RplsIdx[i]]−1, inclusive, that is equal to "no reference picture", a picture is generated as specified in Generation of one unavailable picture and the following applies:
    If st_ref_pic_flag[i][RplsIdx[i]][j] is equal to 1, the value of PicOrderCntVal for the generated picture is set equal to RefPicPocList[i][j].
    Otherwise (i.e. if st_refpic_flag[i][RplsIdx[i]][j] is equal to 0), the value of PicOrderCntVal for the generated picture is set equal to PicOrderCntVal−poc_lsb_lt[i][RplsIdx[i]][j]−(delta_poc_msb_present_flag[i][j]? (DeltaPocMsbCycleLt[i][j]*MaxPicOrderCntLsb):0)
  The value of PicOutputFlag for the generated picture is set equal to 0.
  If st_ref_pic_flag[i][RplsIdx[i]][j] is equal to 1 (i.e. it an STRP entry), the generated picture is marked as "used for short-term reference".
  Otherwise (i.e. if st_ref_pic_flag[i][RplsIdx[i]][j] is equal to 0) (i.e. it an LTRP entry), the generated picture is marked as "used for long-term reference".

RefPicList[i][j] is set to be the generated reference picture.

Generation of one unavailable picture

When this process is invoked, an unavailable picture is generated as follows:

The value of each element in the sample array $S_L$ for the picture is set equal to $1<<(\text{BitDepth}_Y-1)$.

When ChromaArrayType is not equal to 0, the value of each element in the sample arrays $S_{Cb}$ and $S_{Cr}$ for the picture is set equal to $1<<(\text{BitDepth}_C-1)$.

The prediction mode CuPredMode[x][y] is set equal to MODE_INTRA for x=0 . . . pic_width_in_luma_samples−1, y=0 . . . pic_height_in_luma_samples−1.

It should be noted that in one example, the following semantics may be used for nal_unit_type.

nal_unit_type specifies the type of RBSP data structure contained in the NAL unit as specified in Table 10. NAL units that have nal_unit_type in the range of UNSPEC28 . . . UNSPEC31, inclusive, for which semantics are not specified, shall not affect the decoding process specified in this Specification.

NOTE 1—NAL unit types in the range of UNSPEC28 . . . UNSPEC31 may be used as determined by the application. No decoding process for these values of nal_unit_type is specified in this Specification. Since different applications might use these NAL unit types for different purposes, particular care must be exercised in the design of encoders that generate NAL units with these nal_unit_type values, and in the design of decoders that interpret the content of NAL units with these nal_unit_type values. This Specification does not define any management for these values. These nal_unit_type values might only be suitable for use in contexts in which "collisions" of usage (i.e., different definitions of the meaning of the NAL unit content for the same nal_unit_type value) are unimportant, or not possible, or are managed—e.g., defined or managed in the controlling application or transport specification, or by controlling the environment in which bitstreams are distributed.

For purposes other than determining the amount of data in the decoding units of the bitstream, decoders shall ignore (remove from the bitstream and discard) the contents of all NAL units that use reserved values of nal_unit_type.

NOTE 2—This requirement allows future definition of compatible extensions to this Specification.

TABLE 10

| nal_unit_type | Name of nal_unit_type | Content of NAL unit and RBSP syntax structure | NAL unit type class |
| --- | --- | --- | --- |
| 0 | TRAIL_NUT | Coded tile group of a non- STSA trailing picture tile_group_layer_rbsp( ) | VCL |
| 1 | STSA_NUT | Coded tile group of an STSA picture tile_group_layer_rbsp( ) | VCL |
| 2 | RASL_NUT | Coded tile group of a RASL picture tile_group_layer_rbsp( ) | VCL |
| 3 | RADL_NUT | Coded tile group of a RADL picture tile_group_layer_rbsp( ) | VCL |
| 4 . . . 7 | RSV_VCL_4 . . . RSV_VCL_7 | Reserved non-IRAP VCL NAL unit types | VCL |
| 8 | IDR_W_RADL | Coded tile group of an IDR picture tile_group_layer_rbsp( ) | VCL |
| 9 | IDR_N_LP | | |
| 10 | CRA_NUT | Coded tile group of a CRA picture tile_group_layer_rbsp( ) | VCL |
| 11 | RSV_IRAP_VCL11 | Reserved IRAP VCL NAL unit types | VCL |
| 12 | RSV_IRAP_VCL12 | | |
| 13 | RSV_IRAP_VCL13 | | |
| 14 . . . 15 | RSV_VCL14 . . . RSV_VCL15 | Reserved non-IRAP VCL NAL unit types | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | APS_NUT | Adaptation parameter set adaptation_parameter_set_rbsp( ) | non-VCL |
| 19 | AUD_NUT | Access unit delimiter access_unit_delimiter_rbsp( ) | non-VCL |
| 20 | EOS_NUT | End of sequence end_of_seq_rbsp( ) | non-VCL |
| 21 | EOB_NUT | End of bitstream end_of_bitstream_rbsp( ) | non-VCL |
| 22, 23 | PREFIX_SEI_NUT SUFFIX_SEI_NUT | Supplemental enhancement information sei_rbsp( ) | non-VCL |
| 24 . . . 27 | RSV_NVCL24 . . . RSV_NVCL27 | Reserved non-VCL NAL unit types | non-VCL |
| 28 . . . 31 | UNSPEC28 . . . UNSPEC31 | Unspecified non-VCL NAL unit types | non-VCL |

NOTE 3 -
A clean random access (CRA) picture may have associated RASL or RADL pictures present in the bitstream.

NOTE 4 -
An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

NOTE 3—A clean random access (CRA) picture may have associated RASL or RADL pictures present in the bitstream.

NOTE 4—An instantaneous decoding refresh (IDR) picture having nal_unit_type equal to IDR_N_LP does not have associated leading pictures present in the bitstream. An IDR picture having nal_unit_type equal to IDR_W_RADL does not have associated RASL pictures present in the bitstream, but may have associated RADL pictures in the bitstream.

As described above, with respect to Table 7, picture parameter set syntax may include syntax element output_flag_present_flag. It should be noted that picture parameter set syntax may include syntax element output_flag_present_flag for cases where syntax element gra_flag_present_flag is not included in the picture parameter set syntax, for example, as provided in Table 11:

TABLE 11

| | Descriptor |
|---|---|
| pic_parameter_set_rbsp( ) { | |
|    pps_pic_parameter_set_id | ue(v) |
|    pps_seq_parameter_set_id | ue(v) |
|    output_flag_present_flag | u(1) |
|    single_tile_in_pic_flag | u(1) |
| ... | |

As further described above, picture output flags may be conditionally included in tile group header syntax. Table 12A-12C illustrate examples of tile group header syntax for conditionally signaling a flag affecting the output of previously-decoded pictures in the decoded picture buffer base on the type of the current picture.

TABLE 12A

| | Descriptor |
|---|---|
| tile_group_header( ) { | |
|    tile_group_pic_parameter_set_id | ue(v) |
|    if( rect_tile_group_flag \|\| NumTilesInPic > 1 ) | |
|      tile_group_address | u(v) |
|    if( !rect_tile_group_flag && | |
|    !single_tile_per_tile_group_flag ) | |
|      num_tiles_in_tile_group_minus1 | ue(v) |
|    tile_group_type | ue(v) |
|    tile_group_pic_order_cnt_lsb | u(v) |
|    if(nal_unit_type >= IDR_W_RADL && nal_unit_type <= RSV_IRAP_VCL13) | |
|      no_output_of_prior_pics_flag | u(1) |
|    if( output_flag_present_flag ) | |
|      pic_output_flag | u(1) |
| ... | |
| } | |

TABLE 12B

| | Descriptor |
|---|---|
| tile_group_header( ) { | |
|    tile_group_pic_parameter_set_id | ue(v) |
|    if( rect_tile_group_flag \|\| NumTilesInPic > 1 ) | |
|      tile_group_address | u(v) |
|    if( !rect_tile_group_flag && | |
|    !single_tile_per_tile_group_flag ) | |
|      num_tiles_in_tile_group_minus1 | ue(v) |
|    tile_group_type | ue(v) |
|    tile_group_pic_order_cnt_lsb | u(v) |

TABLE 12B-continued

| | Descriptor |
|---|---|
|    if (nal_unit_type == IDR_W_RADL \|\| nal_unit_type == IDR_N_LP) | |
|      no_output_of_prior_pics_flag | u(1) |
|    if( output_flag_present_flag ) | |
|      pic_output_flag | u(1) |
| ... | |
| } | |

TABLE 12C

| | Descriptor |
|---|---|
| tile_group_header( ) { | |
|    tile_group_pic_parameter_set_id | ue(v) |
|    if( rect_tile_group_flag \|\| NumTilesInPic > 1 ) | |
|      tile_group_address | u(v) |
|    if( !rect_tile_group_flag && | |
|    !single_tile_per_tile_group_flag ) | |
|      num_tiles_in_tile_group_minus1 | ue(v) |
|    tile_group_type | ue(v) |
|    tile_group_pic_order_cnt_lsb | u(v) |
|    if (nal_unit_type == IDR_W_RADL \|\| nal_unit_type == IDR_N_LP \|\| (nal_unit_type >= RSV_IRAP_VCL11 && nal_unit_type <= RSV_IRAP_VCL13)) | |
|      no_output_of_prior_pics_flag | u(1) |
|    if( output_flag_present_flag ) | |
|      pic_output_flag | u(1) |
| ... | |
| } | |

With respect to Table 11, the semantics may be based on the semantics provided above with respect to Table 6. With respect to Table 12A-Table 12C, the semantics may be based on the semantics provided above with respect to Table 7, for syntax element no_output_of_prior_pics_flag in one example, the following semantics may be used:

no_output_of_prior_pics_flag affects the output of previously-decoded pictures in the decoded picture buffer after the decoding of an IDR picture that is not the first picture in the bitstream as specified in Annex C.

It should be noted that, in general, in one example, when no_output_of_prior_pics_flag is equal to 0 pictures are output and when no_output_of_prior_pics_flag is equal to 1 pictures are not output. Further, it should be noted that in the example of Tables 12A-12C, the conditions for signaling no_output_of_prior_pics_flag are based on the NAL unit types defined in Table 10. However, the conditions for signaling no_output_of_prior_pics_flag may be modified to correspond to applicable defined NAL unit types. That is, no_output_of_prior_pics_flag may be signaled if a current picture is allowed to have trailing pictures. Also, in one example no_output_of_prior_pics_flag may not be signalled for a CRA picture. In this case, in one example, for CRA pictures, the no_output_of_prior_pics_flag when not present may be inferred to be equal to 1.

The operation of decoded picture buffer operations such as those described below may derive a NoOutputofPriorPics flag as follows:

Operation of the Decoded Picture Buffer (DPB)

General

The specifications in this subclause apply independently to each set of DPB parameters. The decoded picture buffer contains picture storage buffers. Each of the picture storage buffers may contain a decoded picture that is marked as "used for reference" or is held for future output. The processes specified in subclauses ii are applied as specified below.

Removal of Pictures from the DPB

The removal of pictures from the DPB before decoding of the current picture (but after parsing the slice header of the first slice of the current picture) happens instantaneously at the CPB removal time of the first decoding unit of access unit n (containing the current picture) and proceeds as follows:

The decoding process for reference picture list construction-as specified in subclause 8.3.2 of JVET-M1001 and decoding process for reference picture marking as specified in clause 8.3.3 JVET-M1001 is invoked.

When the current picture is an IRAP picture with NoRaslOutputFlag equal to 1 that is not picture 0, the following ordered steps are applied:
1. The variable NoOutputOfPriorPicsFlag is derived for the decoder under test as follows:
   If the current picture is a CRA picture, NoOutputOfPriorPicsFlag is set equal to 1.
   Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.
   NOTE—Although setting NoOutputOfPriorPicsFlag equal to no_output_of_prior_pics_flag is preferred under these conditions, the decoder under test is allowed to set NoOutputOfPriorPicsFlag to 1 in this case.
   Otherwise, NoOutputOfPriorPicsFlag is set equal to no_output_of_prior_pics_flag.
2. The value of NoOutputOfPriorPicsFlag derived for the decoder under test is applied for the HRD, such that when the value of NoOutputOfPriorPicsFlag is equal to 1, all picture storage buffers in the DPB are emptied without output of the pictures they contain, and the DPB fullness is set equal to 0.

When both of the following conditions are true for any pictures k in the DPB, all such pictures k in the DPB are removed from the DPB:
picture k is marked as "unused for reference"
picture k has PicOutputFlag equal to 0 or its DPB output time is less than or equal to the CPB removal time of the first decoding unit (denoted as decoding unit m) of the current picture n; i.e. DpbOutputTime [k] is less than or equal to CpbRemovalTime(m)

For each picture that is removed from the DPB, the DPB fullness is decremented by one.

Operation of the output order DPB

General

The decoded picture buffer contains picture storage buffers. Each of the picture storage buffers contains a decoded picture that is marked as "used for reference" or is held for future output. The process for output and removal of pictures from the DPB as specified below is invoked.

Output and Removal of Pictures from the DPB

The output and removal of pictures from the DPB before the decoding of the current picture (but after parsing the slice header of the first slice of the current picture) happens instantaneously when the first decoding unit of the access unit containing the current picture is removed from the CPB and proceeds as follows:

The decoding process for reference picture list construction—as specified. in subclause 8.3.2 of NET-M1001 and decoding process for reference picture marking as specified in clause 8.3.3 of JVET-M1001.

If the current picture is an IRAP picture with NoRaslOutputFlag equal to 1 that is not picture 0, the following ordered steps are applied:
1. The variable NoOutputOfPriorPicsFlag is derived for the decoder under test as follows:
   If the current picture is a CRA picture, NoOutputOfPriorPicsFlag is set equal to 1.
   Otherwise, if the value of pic_width_in_luma_samples, pic_height_in_luma_samples, or sps_max_dec_pic_buffering_minus1[HighestTid] derived from the active SPS is different from the value of pic_width_in_luma_samples, pic_height_in_luma_samples, or sps_max_dec_pic_buffering_minus1[HighestTid], respectively, derived from the SPS active for the preceding picture, NoOutputOfPriorPicsFlag may (but should not) be set to 1 by the decoder under test, regardless of the value of no_output_of_prior_pics_flag.
   NOTE—Although setting NoOutputOfPriorPicsFlag equal to no_output_of_prior_pics_flag is preferred under these conditions, the decoder under test is allowed to set NoOutputOfPriorPicsFlag to 1 in this case.
   Otherwise, NoOutputOfPriorPicsFlag is set equal to no_output_of_prior_pics_flag.
2. The value of NoOutputOfPriorPicsFlag derived for the decoder under test is applied for the HRD as follows:
   If NoOutputOfPriorPicsFlag is equal to 1, all picture storage buffers in the DPB are emptied without output of the pictures they contain, and the DPB fullness is set equal to 0.
   Otherwise (NoOutputOfPriorPicsFlag is equal to 0), all picture storage buffers containing a picture that is marked as "not needed for output" and "unused for reference" are emptied (without output), and all non-empty picture storage buffers in the DPB are emptied by repeatedly invoking the "bumping" process specified in subclause C.5.2.4, and the DPB fullness is set equal to 0.

Otherwise (the current picture is not an IRAP picture with NoRaslOutputFlag equal to 1), all picture storage buffers containing a picture which are marked as "not needed for output" and "unused for reference" are emptied (without output). For each picture storage buffer that is emptied, the DPB fullness is decremented by one. When one or more of the following conditions are true. the "bumping" process is invoked repeatedly while further decrementing the DPB fullness by one for each additional picture storage buffer that is emptied, until none of the following conditions are true:
The number of pictures in the DPB that are marked as "needed for output" is greater than sps_max_num_reorder_pics[HighestTid].

In this manner, source device 102 represents an example of a device configured to signal a flag in a parameter set indicating whether gradual random access picture information is conditionally present in a tile group header and signal a flag in a tile group header indicating the presence of gradual random access picture information.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols. $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a MCTS sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
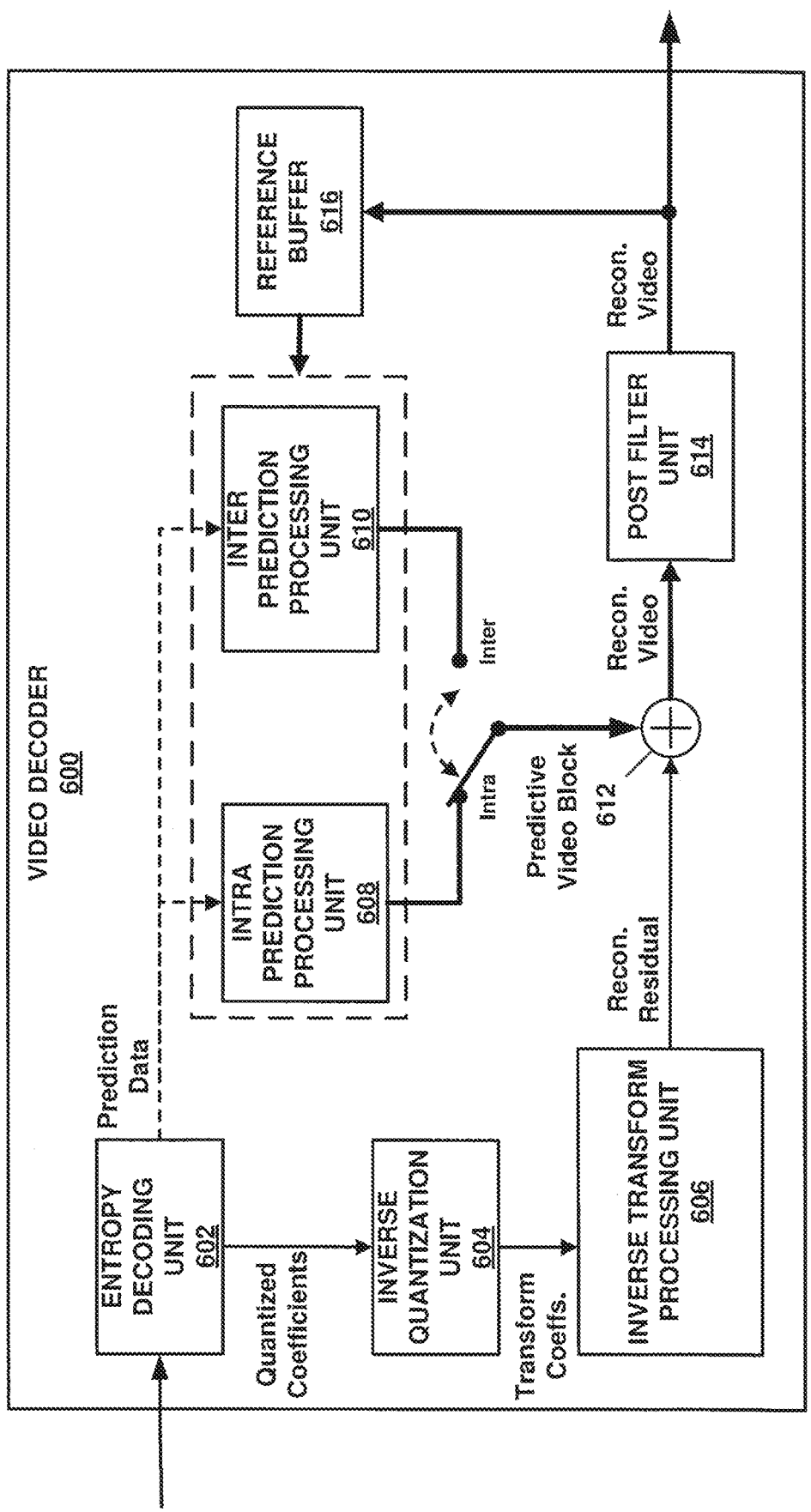
FIG. 6 is a block diagram illustrating an example of a video decoder that may be configured to decode video data according to one or more techniques of this disclosure.

FIG. 6 is a block diagram illustrating an example of a video decoder that may be configured to decode video data according to one or more techniques of this disclosure. In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may be configured to parse any combination of the syntax elements described above in Tables 1-9. Video decoder 600 may decode picture based on or according to the processes described above.

In the example illustrated in FIG. 6, video decoder 600 includes an entropy decoding unit 602, inverse quantization unit and transform coefficient processing unit 604, intra prediction processing unit 606. inter prediction processing unit 608, summer 610, post filter unit 612, and reference buffer 614. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 6, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 6, entropy decoding unit 602 may determine a quantization parameter, quantized coefficient values, transform data, and predication data from a bitstream. In the example, illustrated in FIG. 6, inverse quantization unit and transform coefficient processing unit 604 receives a quantization parameter, quantized coefficient values, transform data, and predication data from entropy decoding unit 602 and outputs reconstructed residual data.

Referring again to FIG. 6, reconstructed residual data may be provided to summer 610 Summer 610 may add reconstructed residual data to a predictive video block and generate reconstructed video data. A predictive video block may be determined according to a predictive video technique (i.e., intra prediction and inter frame prediction). Intra prediction processing unit 606 may be configured to receive intra prediction syntax elements and retrieve a predictive video block from reference buffer 614. Reference buffer 614 may include a memory device configured to store one or more frames of video data. Intra prediction syntax elements may identify an intra prediction mode, such as the intra prediction modes described above. Inter prediction processing unit 608 may receive inter prediction syntax elements and generate motion vectors to identify a prediction block in one or more reference frames stored in reference buffer 616. Inter prediction processing unit 608 may produce motion compensated blocks, possibly performing interpolation based on interpolation filters. Identifiers for interpolation filters to be used for motion estimation with sub-pixel precision may be included in the syntax elements. Inter prediction processing unit 608 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 6, a reconstructed video block may be output by video decoder 600. In this manner, video decoder 600 represents an example of a device configured to parse a flag in a parameter set indicating whether gradual random access picture information is conditionally present in a tile group header, based on the value of the flag in a parameter set conditionally, parse a flag in a tile group header indicating the presence of gradual random access picture information, and generate video data based the presence of gradual random access picture information.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another. e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage. magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors. such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component. or a combination thereof. The general-purpose processor may be a microprocessor. or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of signaling a picture information for decoding video data, the method comprising: signaling a flag in a parameter set indicating whether gradual random access picture information is conditionally present in a tile group header; and signaling a flag in a tile group header indicating the presence of gradual random access picture information.

In one example, a method of decoding video data, the method comprising: parsing a flag in a parameter set indicating whether gradual random access picture information is conditionally present in a tile group header; based on the value of the flag in a parameter set conditionally, parsing a flag in a tile group header indicating the presence of gradual random access picture information; and generating video data based the presence of gradual random access picture information.

In one example, the method, wherein gradual random access picture information includes information affecting decoded picture output and removal processes.

In one example, a device comprising one or more processors configured to perform any and all combinations.

In one example, the device, wherein the device includes a video encoder.

In one example, the device, wherein the device includes a video decoder.

In one example, a system comprising: the device and the device.

In one example, an apparatus comprising means for performing any and all combinations.

In one example, a non-transitory computer-readable storage medium comprising instructions stored thereon that, when executed, cause one or more processors of a device to perform any and all combinations.

In one example, a method of decoding video data, the method comprising: decoding a first syntax element indicating a picture is a random access picture having a recovery point picture; decoding a second syntax element specifying a first picture order count value of the recovery point picture; and generating unavailable reference pictures when the picture is the random access picture, wherein the second syntax element is decoded by using a value the first syntax element.

In one example, the method, wherein the second syntax element is a recovery_poc_cnt syntax element.

In one example, the method, wherein pictures which follow the decoded picture in the output order are exact match to corresponding pictures produced by starting a decoding process form a previous IRAP picture.

In one example, the method, wherein a value of the second syntax element is defined by a difference between the first picture order count value of the recovery point picture and a second picture order count value of the random access picture.

In one example, the method further comprising: setting a picture output flag to zero, when (i) the picture is the random access picture and (ii) the second picture order count value is less than the first picture order count value.

In one example, a method of coding data, the method comprising: coding a first syntax element indicating a picture is a random access picture having a recovery point picture; coding a second syntax element specifying a first picture order count value of the recovery point picture; and generating unavailable reference pictures when the picture is the random access picture, wherein the second syntax element is coded by using a value the first syntax element.

In one example, a device comprising one or more processors configured to perform any and all combinations.

In one example, a device comprising one or more processors configured to perform any and all combinations.

The invention claimed is:

1. A method of decoding video data, the method comprising:
   receiving a video coding layer (VCL) network abstraction layer (NAL) unit;
   parsing a first syntax element in a NAL unit header, wherein the first syntax element has a value indicating the VCL NAL unit and a content of the VCL NAL unit includes a coded slice of a gradual random access picture;
   parsing a second syntax element in a header, which includes information for a slice, within the VCL NAL unit;
   deriving a recovery point picture order count value for a recovery point picture by using the second syntax element;
   determining that there is a picture that follows the gradual random access picture in decoding order that has the recovery point picture order count value, wherein the picture is referred to as the recovery point picture; and
   setting a value of a picture output flag for the gradual random access picture to zero based on a variable for the gradual random access picture being equal to one,
   wherein the variable is set based on whether the gradual random access picture is a first picture in a coded video sequence, and
   wherein the value of the picture output flag for the gradual random access picture being equal to zero provides a condition for removal of the gradual random access picture from a decoded picture buffer.

2. A device comprising one or more processors configured to:
   receive a video coding layer (VCL) network abstraction layer (NAL) unit;
   parse a first syntax element in a NAL unit header, wherein the first syntax element has a value indicating the VCL NAL unit and a content of the VCL NAL unit includes a coded slice of a gradual random access picture;
   parse a second syntax element in a header, which includes information for a slice, within the VCL NAL unit;
   derive a recovery point picture order count value for a recovery point picture by using the second syntax element;
   determine that there is a picture that follows the gradual random access picture in decoding order that has the recovery point picture order count value, wherein the picture is referred to as the recovery point picture; and
   set a value of a picture output flag for the gradual random access picture to zero based on a variable for the gradual random access picture being equal to one,
   wherein the variable is set based on whether the gradual random access picture is a first picture in a coded video sequence, and
   wherein the value of the picture output flag for the gradual random access picture being equal to zero provides a condition for removal of the gradual random access picture from a decoded picture buffer.

3. A device comprising one or more processors configured to:
   signal a video coding layer (VCL) network abstraction layer (NAL) unit;
   parse a first syntax element in a NAL unit header, wherein the first syntax element has a value indicating the VCL NAL unit and a content of the VCL NAL unit includes a coded slice of a gradual random access picture;
   parse a second syntax element in a header, which includes information for a slice, within the VCL NAL unit;
   derive a recovery point picture order count value for a recovery point picture by using the second syntax element;
   determine that there is a picture that follows the gradual random access picture in decoding order that has the recovery point picture order count value, wherein the picture is referred to as the recovery point picture; and
   set a value of a picture output flag for the gradual random access picture to zero based on a variable for the gradual random access picture being equal to one,
   wherein the variable is set based on whether the gradual random access picture is a first picture in a coded video sequence, and
   wherein the value of the picture output flag for the gradual random access picture being equal to zero provides a condition for removal of the gradual random access picture from a decoded picture buffer.

* * * * *